(12) United States Patent
Park

(10) Patent No.: US 12,163,919 B2
(45) Date of Patent: Dec. 10, 2024

(54) LATERALLY-EXTENDED TRAPPED ION MOBILITY SPECTROMETER

(71) Applicant: Bruker Scientific LLC, Billerica, MA (US)

(72) Inventor: Melvin Andrew Park, Billerica, MA (US)

(*) Notice: Subject to any disclaimer, the term of this patent is extended or adjusted under 35 U.S.C. 154(b) by 432 days.

(21) Appl. No.: 17/208,455

(22) Filed: Mar. 22, 2021

(65) Prior Publication Data

US 2022/0299473 A1   Sep. 22, 2022

(51) Int. Cl.

| | |
|---|---|
| *G01N 27/622* | (2021.01) |
| *G01N 27/623* | (2021.01) |
| *H01J 49/04* | (2006.01) |
| *H01J 49/06* | (2006.01) |
| *H01J 49/10* | (2006.01) |
| *H01J 49/42* | (2006.01) |

(52) U.S. Cl.
CPC ......... *G01N 27/622* (2013.01); *G01N 27/623* (2021.01); *H01J 49/0418* (2013.01); *H01J 49/065* (2013.01); *H01J 49/10* (2013.01); *H01J 49/4235* (2013.01)

(58) Field of Classification Search
CPC ... G01N 27/622; H01J 49/065; H01J 49/4235
See application file for complete search history.

(56) References Cited

U.S. PATENT DOCUMENTS

| | | | |
|---|---|---|---|
| 6,630,662 B1 | 10/2003 | Loboda | |
| 7,838,826 B1 | 11/2010 | Park | |
| 9,683,964 B2 | 6/2017 | Park et al. | |
| 10,458,944 B2 | 10/2019 | Park et al. | |
| 2011/0266435 A1* | 11/2011 | Hoyes | H01J 49/062 250/288 |
| 2014/0299766 A1* | 10/2014 | Anderson | H01J 49/062 250/200 |
| 2015/0206731 A1* | 7/2015 | Zhang | H01J 49/066 250/396 R |

(Continued)

FOREIGN PATENT DOCUMENTS

| | | |
|---|---|---|
| GB | 2555247 A | 12/2017 |
| WO | WO-2022175467 A1 * | 8/2022 |

OTHER PUBLICATIONS

Michelmann, K. et al., "Fundamentals of Trapped Ion Mobility Spectrometry", J. Am. Soc. Mass Spectrom., 2015, 26, 14-24.

*Primary Examiner* — Michael J Logie
(74) *Attorney, Agent, or Firm* — Benoît & Côté Inc.

(57) ABSTRACT

The invention provides a trapped ion mobility separator (TIMS) and methods to operate it wherein an ion region of the TIMS, through which ions travel along an axis from an entrance to an exit, has an elongate cross-sectional profile perpendicular to the axis with a long dimension and a short dimension. First and second counteracting forces on the ions along the axis are provided, wherein at least one of the first and second forces has an effect on the ions that is ion mobility dependent, and wherein at least one of the first and second forces varies spatially along the axis such that ions are trapped and separated by ion mobility. Different embodiments provide the first and second forces using different combinations of gas flow and electric field potential, and employ various electrode structures that provide the system with different advantageous characteristics.

19 Claims, 23 Drawing Sheets

(56) References Cited

U.S. PATENT DOCUMENTS

| | | | |
|---|---|---|---|
| 2017/0092477 A1* | 3/2017 | Giles | H01J 49/0027 |
| 2019/0108990 A1* | 4/2019 | Prabhakaran | H01J 49/062 |
| 2019/0162698 A1 | 5/2019 | Gillig et al. | |
| 2019/0164737 A1* | 5/2019 | Gillig | G01N 27/623 |
| 2019/0237319 A1* | 8/2019 | Green | H01J 49/0031 |
| 2022/0365027 A1* | 11/2022 | Makarov | G01N 27/622 |

\* cited by examiner

LATERALLY-EXTENDED TRAPPED ION MOBILITY SPECTROMETER

FIELD OF THE INVENTION

The invention relates to methods and apparatus for ion mobility spectrometry, in particular trapped ion mobility spectrometry, and hybrid systems using ion mobility spectrometry and mass spectrometry.

BACKGROUND OF THE INVENTION

Ion mobility spectrometry (IMS) is an analytical technique that is used to investigate the mobility of ions in a gas and to separate them according to their mobility. An inherent feature of ion mobility spectrometry is that the mobility of ions in a gas depends on molecular geometries of the ions such that it is often possible to resolve and thus separate isomers or conformers that cannot be resolved by mass spectrometry. Many applications also take advantage of the ability to determine the cross section of an analyte ion from its measured mobility. Knowledge of mobilities or cross sections has proven to be significant in many areas including identifying analytes (e.g. in proteomics and metabolomic), separating compound classes and determining molecular structures (e.g. in structural biology).

In trapped ion mobility spectrometry (TIMS), ions are trapped along a non-uniform electric DC field, typically an electric field gradient, by a counteracting gas flow, or along a uniform electric DC field by a counteracting gas flow which has a non-uniform axial velocity profile. The trapped ions are separated in space according to ion mobility, and are subsequently eluted over time according to their mobility by adjusting either the gas velocity or the strength of the axial electric DC field (see, e.g., U.S. Pat. No. 6,630,662 B1 by Loboda and U.S. Pat. No. 7,838,826 B1 by Park). The theoretical basis of TIMS is also described, for example, in the article "Fundamentals of Trapped Ion Mobility Spectrometry" by Michelmann et al. (J. Am. Soc. Mass Spectrom., 2015, 26, 14-24).

U.S. Pat. No. 9,683,964 (Park et al.) teaches a TIMS analyzer comprising a trapping region and a separating region for parallel accumulation. The TIMS analyzer accumulates ions in the trapping region while pre-accumulated ions are analyzed in the separating region parallel in time. A gas flow drives ions against a ramp of a counteracting electric DC field barrier of the trapping region such that the ions are axially trapped and get separated according to their mobility at locations along the ramp. During the accumulation of ions in the trapping region, the gas flow also drives ions, which have been accumulated in a prior accumulation and transferred to the separating region, against a ramp of a counteracting electric DC field barrier of the separating region such that the ions get axially trapped and spatially separated according to their mobility. After loading the separating region with accumulated ions to be analyzed, the height of the counteracting electric DC field barrier is steadily decreased such that ion species are released from the separating region in the sequence of their mobility.

U.S. Pat. No. 10,458,944 (Park et al.) teaches to use higher order (order N>2) linear multipole RF systems to accumulate and analyze ions at an electric DC field barrier of a TIMS analyzer, either pure higher order RF multipole systems or multipole RF systems with transitions from higher order towards lower order in front of the apex of the electric DC field barrier.

Despite the fact that ions are accumulated at spatially separated positions according to their mobility and using higher order fields, there is still a need for a further increased storage capacity for TIMS analyzers without considerable losses of ions by space charge effects. An enhanced storage capacity increases the sensitivity and enables analyzing and identifying more low abundant analytes, in particular in the field complex samples like in bottom-up proteomics or metabolomics.

SUMMARY OF THE INVENTION

In a first aspect, the present invention provides a trapped ion mobility separator (TIMS) which comprises an ion region through which ions travel along an axis from an entrance to an exit, a series of electrode structures, a first force-generator that exerts a first axial force on the ions along the axis and a second force-generator that exerts a second axial force on the ions along the axis which is counteracting the first axial force, wherein at least one of the first and second axial forces has an effect on the ions that is ion mobility dependent, and wherein at least one of the first and second axial forces varies spatially along the axis such that ions are trapped and separated by ion mobility along the axis during an accumulation phase, and wherein the first and/or the second force generator is configured to vary the magnitude of the first force relative to the second force over time during an elution phase such that the ions are progressively driven to the exit as a function of ion mobility.

The ion region contains a gas through which the ions pass and has an elongate cross-sectional profile perpendicular to the axis with a long dimension and a short dimension. The TIMS according to the present invention is called a laterally extended TIMS (LXTIMS). The series of electrode structures are arranged along the axis and encompass the elongate cross-sectional profile along at least said long dimension, wherein each electrode structure comprises an electrode or an electrode set to which one or more varying voltage potentials are applied so as to generate a first electric confining field that exerts a confinement force on the ions in the ion region relative to said short dimension. The laterally extended TIMS comprises means to generate the varying voltage potentials, e.g., RF-generators.

The ratio W/H between a width W of the ion region along the long dimension and a height H of the ion region along the short dimension is preferably greater than 2, more preferably greater than 5, and can be even greater than 10. The width W of the ion region along the long dimension is preferably greater than 20 mm, more preferably greater than 50 mm, and can be even greater than 100 mm. The length L of the ion region along the axis is preferably greater than 50 mm, more preferably greater than 100 mm, and can even be greater than 200 mm. The ratio L/W between a length L of the ion region along the axis and the width W of the ion region along the long dimension is preferably less than 5, more preferably less than 2, can even be less than 1. The ratio L/W is most preferably between 1.5 and 3.

A major advantage of the laterally extended TIMS compared to common TIMS devices is that ions are not trapped along a line, but in an extended volume that is substantially elongated in one lateral direction such that the charge capacity is significantly increased without scarifying the mobility resolution.

The elongate cross-sectional profile is preferably convex, i.e., for any given two points inside the cross-sectional profile, all points along a line segment between the two points lie also inside the cross-sectional profile. Furthermore, the elongate cross-sectional profile preferably has reflective symmetry through a plane containing the axis and the long dimension. However, the cross-sectional profile can also be non-convex, e.g., horseshoe shaped, serpentine or shaped like the space between a closed outer surface and a closed inner surface, such as an annulus. The closed outer surface can, for example, be a circle that is coaxially aligned with a smaller inner circle. In the case of a closed outer surface encompassing a closed inner surface, the long dimension is a closed path between the surfaces and the short dimension is the shortest path between the surfaces. The elongate cross-sectional profile can be constant along the axis or can vary along the axis.

The electrode structures can encompass the elongate cross-sectional profile of the ion region partly, e.g., only along said long dimension, or completely. The varying voltage potential applied to the electrode or electrode set can generate a second electric confining field that exerts a confinement force on the ions in the ion region relative to said long dimension. The laterally extended TIMS can further comprise additional electrodes at one or both sides of the ion region in the long dimension to which electric RF or DC potentials are applied so as to generate a second electric confining field that exerts a confinement force on the ions in the ion region relative to said long dimension. The first and second electric confining fields can generate a continuously-extending trapping region along said long dimension or multiple separated trapping regions along said long dimension.

In a first embodiment of the electrode structures, each electrode structure comprises an elongate electrode that extends parallel to said long dimension, wherein the elongate electrodes are located, respectively, on first and second sides of the ion region relative to the short dimension in an alternating arrangement along the axis, with opposite phases of a first RF voltage being applied to adjacent elongate electrodes on the first side, and opposite phases of a second RF voltage being applied to adjacent elongate electrodes of the second side.

The first RF voltage and the second RF voltage preferably have different frequencies. The two frequencies vary preferably by more than 10%, more preferably by more than 20%, most preferably by more than 50%. The ratio between the two frequencies f1 and f2 is preferably not a whole number, e.g. f1/f2=1.2/0.86 or 1.8/1.2, so as to minimize possible resonant excitation of ion motion. The average frequency is preferably between 0.5 and 10 MHz, more preferably around 1 MHz. The operating pressure is preferably less than 5000 Pa, more preferably less than 1000 Pa, typically between 200 and 700 Pa.

The elongate electrodes of the first side preferably have a relative spacing equal to a relative spacing of the elongate electrodes of the second side, wherein, relative to the elongate electrodes of the first side, positioning of the elongate electrodes of the second side along the axis is offset by a distance equal to half of said relative spacing. The ratio H/S between the height H of the ion region along the short dimension and the spacing S of the elongate electrodes is preferably less than 10, more preferably less than 5, most preferably less than 3, at least for a sub-set of the electrodes.

The elongate electrodes preferably have, at each end relative to said long dimension, an extended portion in the short dimension such that RF potentials applied to the elongate electrodes generate a second electric confining field that exerts a confinement force on ions in the ion region relative to said long dimension. More preferably, the elongate electrodes each comprise a cylindrical portion in the long dimension, and the extended portion at each end has a flat shape with a curved edge facing the ion region. However, the electrode structures of the first embodiment can instead comprise DC electrodes adjacent to the ends of the elongate electrodes relative to said long dimension, to which DC potentials are applied that generate a second electric confining field that exerts a confinement force on ions in the ion region relative to said long dimension.

In a second embodiment of the electrode structures, each electrode structure comprises an electrode that encompasses the ion region at a position along the axis different from that of the other electrode structures. The electrode structure can for example comprise a closed loop electrode. A common RF voltage is applied to each of the electrodes, with opposite phases of said common RF voltage being applied to electrodes of adjacent electrode structures. The operating pressure is preferably less than 5000 Pa, more preferably less than 1000 Pa, typically between 200 and 700 Pa.

In a third embodiment of the electrode structures, each electrode structure comprises a plurality of electrode components spaced along said long dimension on opposite sides of the ion region. Transient DC potentials are applied to the electrode components such that a sequence of low and high DC potentials progresses in the long dimension on either side of the electrode structure. The operating pressure is preferably higher than 5000 Pa, more preferably higher than 20000 Pa, and can even be higher than atmospheric pressure.

In a fourth embodiment of the electrode structures, each electrode structure comprises a set of electrode components that extend along said long dimension on opposite sides of the ion region and an RF voltage is applied to the electrodes of the set such that opposite phases of the RF voltage are applied to adjacent electrode components and to electrode components that are aligned with each other in said long dimension on opposite sides of the ion region, so as to generate multiple separated ion channels along said long dimension. The operating pressure is preferably less than 5000 Pa, more preferably less than 1000 Pa, typically between 200 and 700 Pa.

The first axial force and second axial force of a laterally extended TIMS may be of different respective types. Each of them can be generated by one of an axial gas flow, an axial electric DC field and an axial transient electric DC field. The electric DC potentials or transient electric DC potentials are preferably applied to the electrode structures to generate the axial electric DC field or the axial transient electric DC field, respectively. If the opposing forces are a gas flow and an axial electric DC field, and the velocity of the gas flow as well as the field strength vary along the axis, the spatial variation of the field strength along the axis can be adjusted such that ion species with different ion mobilities occupy the same space along the axis when they are trapped in the laterally extended TIMS.

At least one of the first and second axial forces that varies spatially along the axis comprises preferably a gradient along a first portion that flattens to a plateau of substantially constant force. The trapped ions in the ion region preferably extend parallel to the plateau in a vicinity of the plateau.

The first or the second axial force of a laterally extended TIMS can be a gas flow, and the system preferably comprises a housing surrounding the electrode structures that guides the gas flow. The gas flow preferably has a substantially constant velocity in the ion region along said long dimension in a vicinity of a plateau of the first and/or second axial force. Substantially constant means that the gas velocity preferably varies along the long dimension by less than 50%, more preferably by less than 20% compared to the maximum gas velocity. The housing can have approximately the same size as the ion region along said short dimension, but may extend significantly further along said long dimension than the ion region. The ratio L/W between a length L of the ion region along the axis and a width W of the ion region along the long dimension can be less than two, less than one, and even be less than ½. The gas flow can be generated by either or both of pumping away gas from an entrance or exit of the ion region and laterally introducing gas into the ion region.

The laterally extended TIMS can further comprise one or more additional components, such as an ion trap located upstream of the ion region, an ion funnel located upstream of the ion region for focusing ions into the entrance of the ion region, and/or an ion funnel located downstream of the ion region for spatially focusing ions released at the exit of the ion region. The ion trap can be, for example, a linear multipole RF ion trap, an axially segmented linear multipole ion trap, or a stacked ring ion trap, and may include means to generate and control an axial electric DC field along its axis. The ion trap can also be a second laterally extended TIMS used for storing ions at mobility dependent positions along the axis of the ion trap.

In another embodiment, the ion trap is arranged adjacent to the ion region, coaxial with the axis of the laterally extended TIMS. An ion trap adjacent to the ion region preferably has substantially the same width and height as the ion region. In another preferred embodiment, an ion funnel is located between the ion trap and the ion region of the laterally extended TIMS, and the ion trap is arranged non-coaxially, preferably orthogonally, to the axis of the laterally extended TIMS.

The laterally extended TIMS can be part of a hybrid system that comprises an ion source upstream of the laterally extended TIMS and a mass analyzer with an ion detector downstream of the laterally extended TIMS. The ion source of the hybrid system can generate ions, for example, using spray ionization (e.g., electrospray (ESI) or thermal spray), desorption ionization (e.g., matrix-assisted laser/desorption ionization (MALDI) or secondary ionization), chemical ionization (CI), photo-ionization (PI), electron impact ionization (EI), or gas-discharge ionization. The mass analyzer of the hybrid systems can, for example, be one of a time-of-flight analyzer (preferably with orthogonal injection of ions), an electrostatic ion trap, an RF ion trap, an ion cyclotron frequency ion trap and a quadrupole mass filter.

The hybrid system can further comprise a fragmentation cell located between the laterally extended TIMS and the mass analyzer. The ions can, for example, be fragmented in the fragmentation cell by collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) or fragmentation by reactions with highly excited or radical neutral particles. The hybrid system may further comprise a mass filter that is located between the laterally extended TIMS and the fragmentation cell.

The hybrid system can comprise a mass filter upstream and/or a fragmentation cell upstream and further ion mobility separators, preferably a TIMS and more preferably a laterally extended IMS. The hybrid system can comprise two laterally extended TIMS between which an activation cell and/or a fragmentation cell are located. The two laterally extended TIMS can be operated as a tandem ion mobility spectrometer inside the hybrid system. Preferably, an ion gate is located between the upstream laterally extended TIMS and the activation or fragmentation cell. The two laterally extended TIMS are preferably arranged non-coaxially, preferably orthogonally, and each comprise an upstream ion trap. Furthermore, a separation device, like gas or liquid chromatography device or an electrophoretic device, can be part of or coupled to the hybrid system.

In a second aspect, the present invention provides a method for analyzing ions according to mobility using a trapped ion mobility separator. The method comprises the steps of:

providing an ion region through which ions travel along an axis from an entrance to an exit, the ion region containing a gas through which the ions pass and having an elongate cross-sectional profile perpendicular to the axis with a long dimension and a short dimension;

providing a series of electrode structures that are arranged along the axis and that encompass the elongate cross-sectional profile along at least said long dimension, each electrode structure comprising an electrode or a set of electrodes;

generating a first electric confining field that exerts a confinement force on the ions in the ion region relative to said short dimension by applying a varying voltage potential to the electrodes or electrode set;

generating a first axial force that is imparted to the ions along the axis;

generating a second axial force that is imparted to the ions along the axis and that counteracts the first force, wherein at least one of the first and second axial forces varies spatially along the first axial direction such that ions are trapped and separated by ion mobility along the axis; and varying at least one of the first and second axial forces to increase a magnitude of the first axial force relative to the second force over time such that the ions are progressively driven to the exit of the ion region and separated as a function of ion mobility.

The method further comprises generating a second electric confining field that exerts a confinement force on the ions in the ion region relative to said long dimension by applying the varying voltage potential to the electrodes or electrode set, and/or by applying RF potentials or DC potentials to additional electrodes.

The first axial force and second axial force may be of different respective types, each being generated by one of an axial gas flow, an axial electric DC field and an axial transient electric DC field. Electric DC potentials or transient electric DC potentials can be applied to the electrode structures to generate the axial electric DC field or the axial transient electric DC field, respectively.

The ions can be generated in an ion source from molecular constituents of a sample using one of spray ionization (e.g., electrospray (ESI) or thermal spray), desorption ionization (e.g., matrix-assisted laser/desorption ionization (MALDI) or secondary ionization), chemical ionization (CI), photo-ionization (PI), electron impact ionization (EI), or gas-discharge ionization. Furthermore, the analytes can be separated by a separation device, like a gas or liquid chromatography device or an electrophoretic device, which is coupled to the ion source.

The method further comprises accumulating ions from an ion source in an ion trap located upstream of the laterally extended trapped ion mobility separator while ions are analyzed in the laterally extended trapped ion mobility separator.

The method can further comprise detecting separated ions with an ion detector or analyzing separated ions as a function of mass in a mass analyzer located downstream of the trapped ion mobility separator. Separated ions can be fragmented into fragment ions, and the fragment ions can be analyzed in a mass analyzer located downstream of the trapped ion mobility separator. The separated ions can be selected and/or filtered according to mass prior to the fragmentation.

The method can further comprise selecting ions of specific ion mobility, and activating or fragmenting the selected ions in a downstream activation/fragmentation cell, wherein the activated/fragmented ions are analyzed according to ion mobility.

DETAILED DESCRIPTION

Figure 1A:
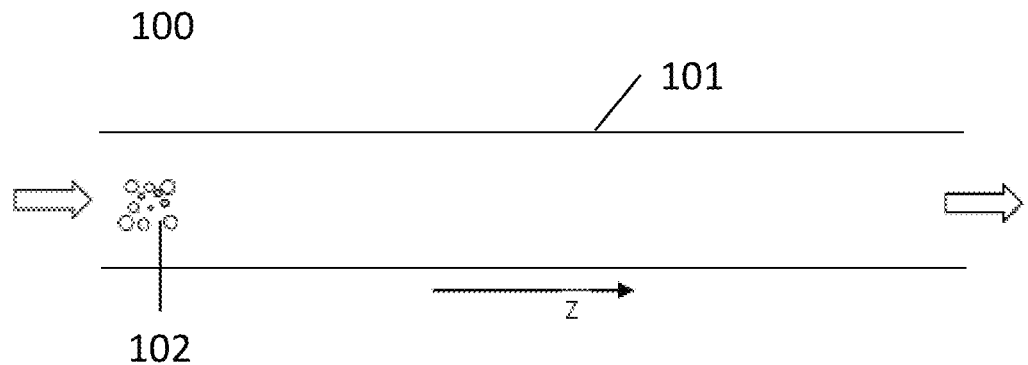
FIG. 1A is a schematic depiction of a general version of a laterally extended TIMS according to the present invention.
Figure 1B:
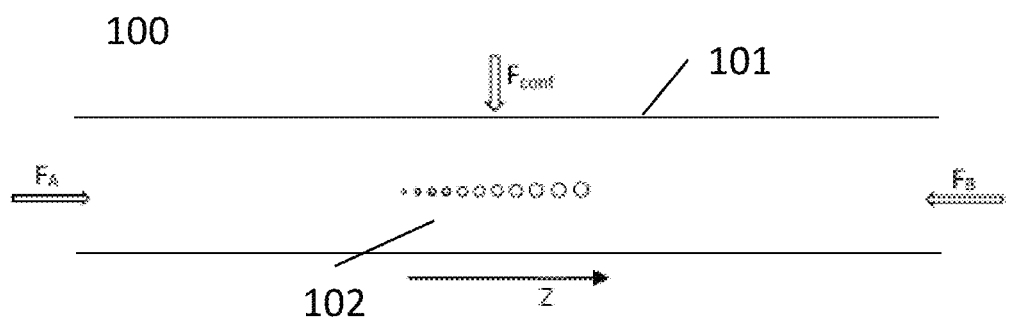
FIG. 1B shows the laterally extended TIMS of FIG. 1A with the ions trapped and separated therewithin.
Figure 1C:
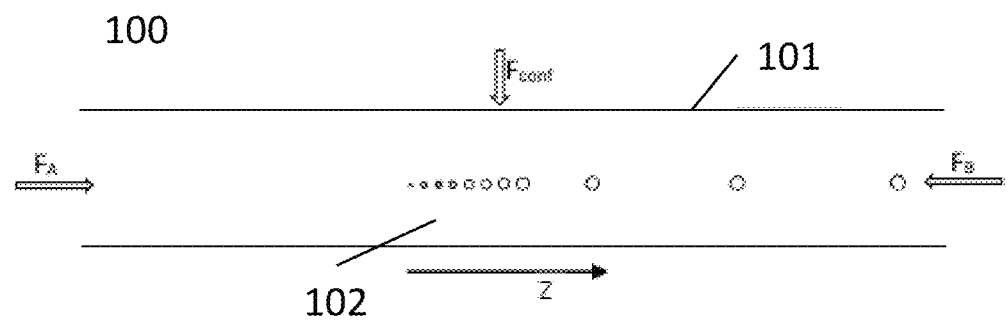
FIG. 1C shows the laterally extended TIMS of FIG. 1A as the trapped ions are being eluted.

FIGS. 1A-1C show schematically three stages of operation for a general version of a laterally extended TIMS 100 according the invention. The laterally extended TIMS 100 includes an ion region 101, which typically includes electrode structures (not shown) that surround the ion region at least partly, in particular in a plane perpendicular to the drawing plane. Each electrode structure includes an electrode or a set of electrodes for generating electric fields within the ion region 101. As shown in FIG. 1A, ions 102 enter from one side of the ion region 101, and will eventually travel to the opposite side of the channel, being temporarily trapped along the way at mobility dependent positions. The ions 102 are the molecular constituents of a sample material of interest, which have been ionized and introduced to the ion channel, typically from an ionization source of a known type, such as an electrospray or MALDI (matrix-assisted laser desorption ionization) type ion source or CI (chemical ionization) ion source. The ions 102 enter the ion region 101 having arbitrary position and velocity, but will be separated by ion mobility prior to leaving the channel. From there, they may be directed to an ion detector (for example, as part of an ion mobility spectrometer), or to another analysis system that makes use of the separated ions (for example, a mass analyzer).

The direction of travel of the ions 102 along the ion region 101 is defined as the axis of laterally extended TIMS 100 (z-direction), and is indicated by the arrows in FIGS. 1A-1C. Separation of the ions 102 by ion mobility is done with the use of opposing forces $F_A$ (first force) and $F_B$ (second force) in an axial direction relative to the ion region 101, which produce counteracting velocity components at least one of which depends on ion mobility, and which thereby effects a mobility dependent separation. One of the opposing forces may be generated by a gas flow along the z axis, either in the same direction as the ion travel, or in an opposite direction. It is also possible that the counteracting force is generated by an electric DC field, acting on the ions in the presence of a residual gas.

At least one of the opposing forces $F_A$ and $F_B$ also varies spatially along at least a portion of the z-axis. The opposing forces $F_A$ and $F_B$ are preferably balanced such that, for each species of ion of interest in the group of ions 102, an equilibrium point of zero velocity exists within the ion region 101. Since a mobility-dependent force has a different influence on ion species of different mobility, the spatial position along the z axis for which the net velocity of an ion species is zero will depend on the mobility K of that ion. Thus, as shown schematically in FIG. 1B, the ion species are trapped along the axis at mobility dependent positions under the influence of the opposing axial forces $F_A$ and $F_B$. In the figure, the ion species are shown as circles, with circles of larger diameter representing ions of larger cross-section and thus of lower mobility K. Those skilled in the art will understand, however, that the ions 102 could also be separated along the z-axis from higher to lower mobility, depending on the relative arrangement of the opposing axial forces.

The trapped ions 102 are eventually eluted from the ion region 101 by changing one or both of the forces $F_A$ and $F_B$ such that the velocity components change and the equilibrium point for an ion species to be eluted is not within the ion region 101. This relative change in the opposing axial forces may be progressive, such that ion species of increasing or decreasing mobility K successively exit the laterally extended TIMS 100 in the z direction. In FIG. 1C, for example, the ions 102 are eluted from the laterally extended TIMS 100 from lower to higher mobility K.

In addition to the opposing axial forces $F_A$ and $F_B$, the invention also makes use of a lateral confinement force $F_{CONF}$, which confines the ions in the ion region 101. This force is indicated in FIGS. 1B and 1C by the radially-directed arrow labeled $F_{CONF}$.

Figure 2A:
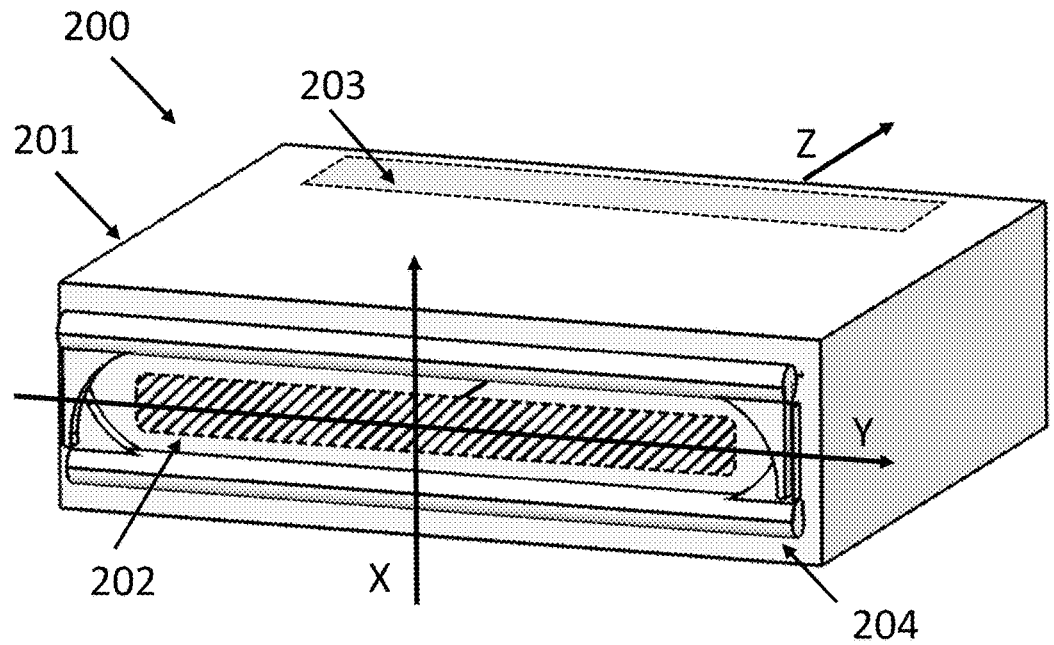
FIG. 2A shows a laterally extended TIMS according to the present invention using RF-potentials of different frequency to confine ions inside an ion region and generating a gas flow and an electric DC field gradient that function as first and second axial forces.

A first embodiment of the invention is shown in FIGS. 2A-2E. The schematic, perspective view of FIG. 2A shows an outer housing 201 of the laterally extended TIMS 200, which is operated at a pressure between 10 and 5000 Pa, for example around 300 Pa. As in the more general depiction of FIGS. 1A-1C, ions enter the laterally extended TIMS 200 at a first side and travel in the direction of the z axis. The ions are subjected to opposing axial forces within the ion region 202 of the laterally extended TIMS 200, generated by a gas flow in the positive direction of the z axis and an electric DC field gradient in the negative direction of the z axis. In particular, the gas has a substantially constant velocity within the ion region in the z direction, while the electric DC field gradient, having a polarity opposite that of the ions, increases in magnitude along the z direction from zero to a maximum value at a plateau 203. As discussed below, the set 204 of electrode structures provides the DC field gradient, as well as a confinement force on the ions in the ion region.

Figure 2B:
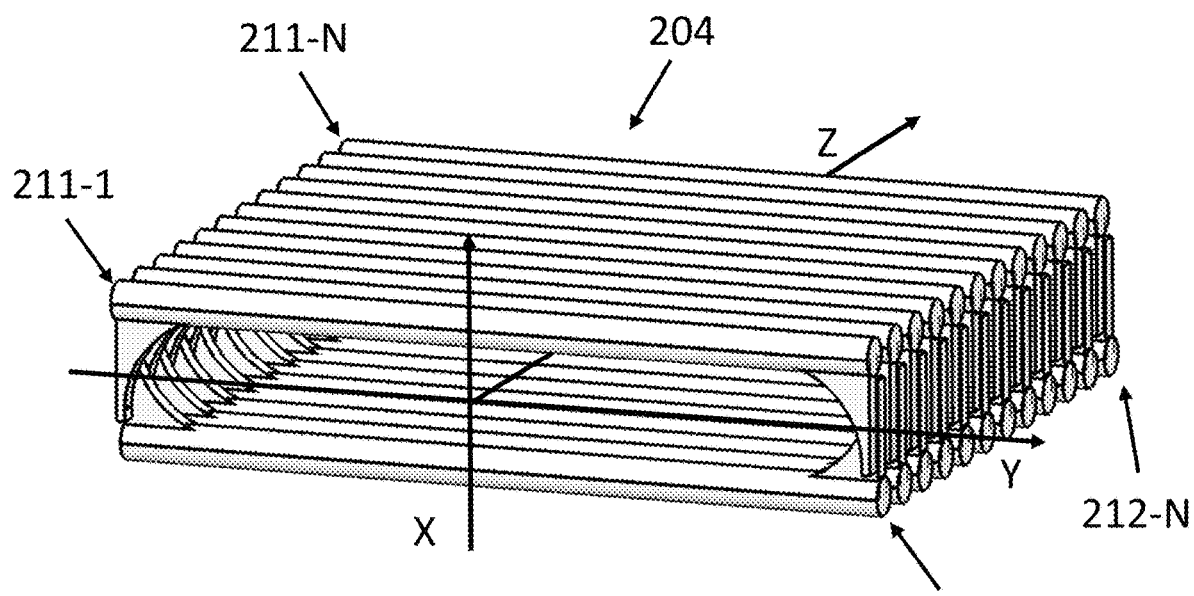
FIG. 2B shows a set of electrode structures of the laterally extended TIMS of FIG. 2A, wherein each electrode structure comprises a single electrode.
Figure 2C:
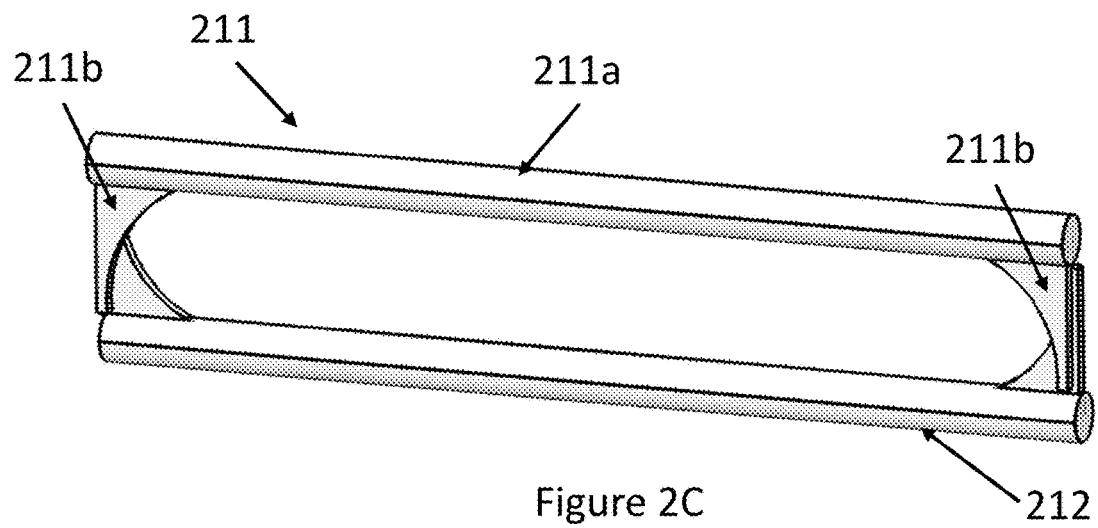
FIG. 2C shows two of the adjacent electrode structures of FIG. 2B located, respectively, to either side of the ion region along the short dimension.

FIG. 2B is a schematic view of the electrode structures 211, 212 used with the configuration of FIG. 2A. Each electrode structure is significantly longer in the long dimension, y, than in the short dimension x, and includes an elongate electrode that extends in the long dimension and that is connected to extended portions located at each end of the elongate electrode. The electrodes structures 211 have a spatial offset relative to the electrode structures 212 along the z-direction. In the present embodiment, the elongate electrodes have a cylindrical profile, although other electrode shapes may also be used. The electrode structures 211 are oriented with the elongate electrode above the ion region, while the electrode structures 212 are oriented with the elongate electrode below the ion region. The extended portions located at the ends of each elongate electrode extend in the x-direction toward the interior of the housing, and have a generally flat shape with a curved edge facing the ion region. One of each of the electrode structures 211 and the electrode structures 212 are shown in isolation in FIG. 2C and, as shown with regard to the upper electrode structure 211, the elongate electrode is identified by reference numeral 211a, while the extended portions are identified by reference numeral 211b. Those skilled in the art will understand that the electrode structures 212 may be identified using corresponding reference numerals 212a (for the elongate electrode) and 212b (for the extended portions).

The electrode structures are adjacent to one another, in an alternating arrangement along the z direction of electrode structures 211 and electrode structures 212, as shown in FIG. 2B. For reference purposes, the upper electrode structures 211 in FIG. 2B are identified as electrode structures 211-1 to 211-N, and those skilled in the art will understand that a similar nomenclature may be applied to the lower electrode structures 212. As discussed below, electrical DC potentials are applied to the electrode structures so as to control the movement and positioning of the ions in the ion region. Because of the oblong shape of the ion region formed by the electrode structures, ions in the ion region will distribute themselves along the y direction, although the control of the ion movement is in the axial direction (z direction) of the TIMS.

Figure 2D:
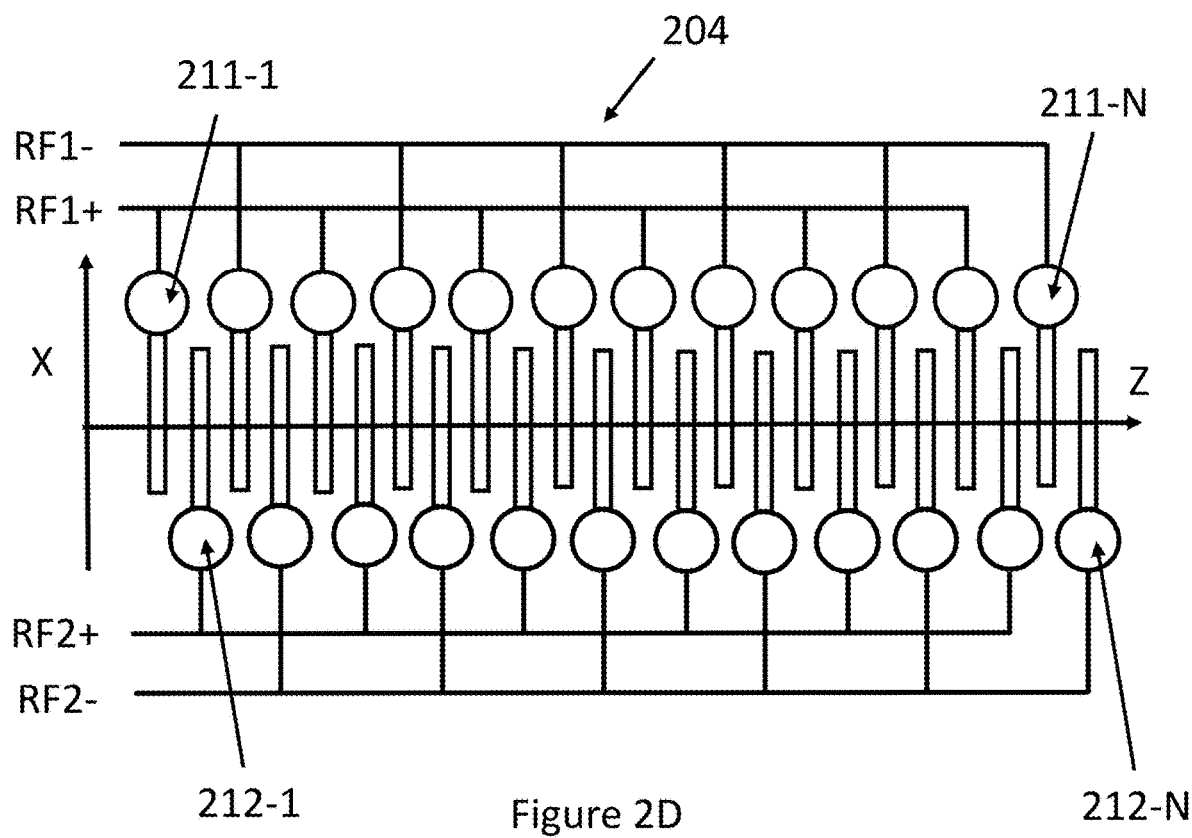
FIG. 2D shows schematically how the electrode structures of FIG. 2B are supplied with RF-potentials.

FIG. 2D is a schematic view in the y-direction of the electrode structures 211, 212 of FIG. 2B that shows how different RF potentials are applied thereto. In this embodiment, two different RF potentials are used that have different frequencies, RF1 being applied to the electrode structures 211 and RF2 being applied to the electrode structures 212. As shown in the figure, the 211 electrode structures alternate with the 212 electrode structures along the z-direction, and for each of the RF potentials, two opposite phases of the signal are used. For example, a first phase of RF1 (RF1+) is applied to every other electrode structure 211, while an opposite phase, RF1− (which is 180° out of phase with RF1+) is applied to the other electrode structures 211. Similarly, a first phase of RF2 (RF2+) is applied to every other electrode structure 212, while an opposite phase, RF2−, is applied to the remaining electrode structures 212. An important advantage of applying RF potentials of two different frequencies to the electrode structures of both sides, and offsetting the electrode structures on both sides, is that substantially no pseudo-potential wells are produced inside the ion region along the axis.

Figure 2E:
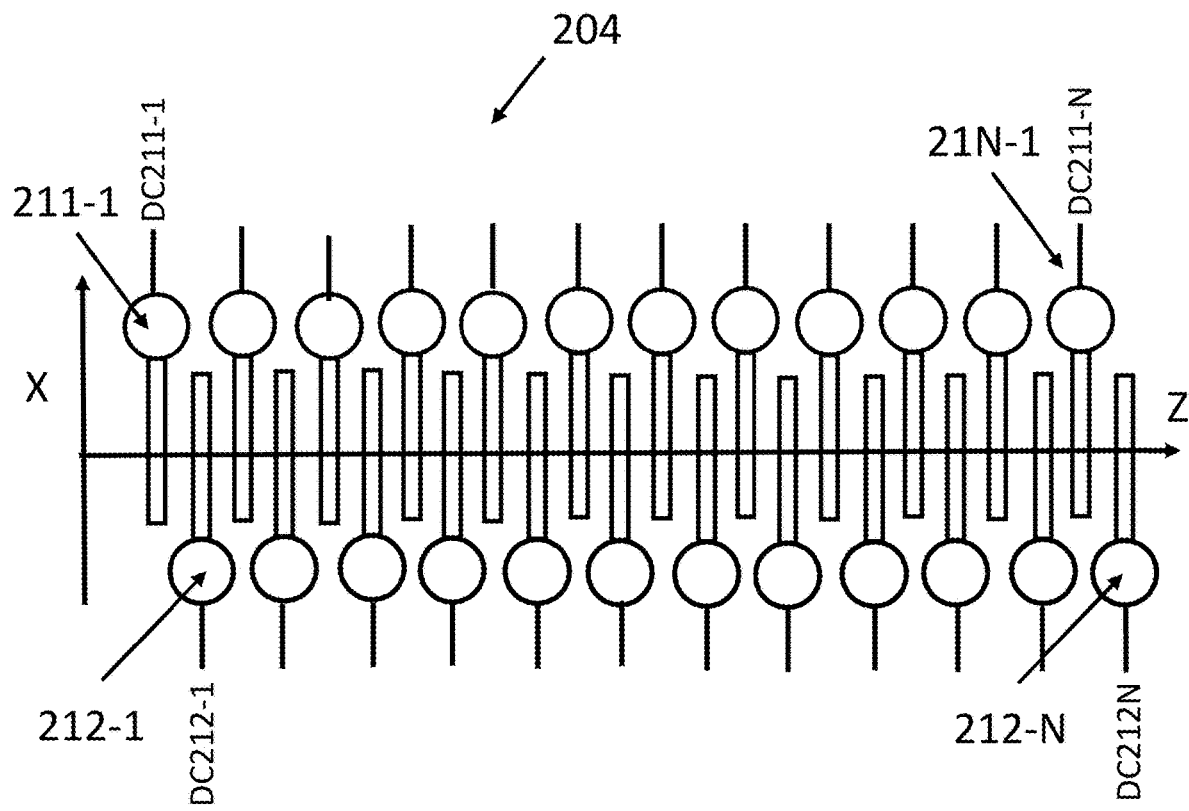
FIG. 2E shows schematically how the electrode structures of FIG. 2B are supplied with DC potentials.

As shown in FIG. 2E, DC potentials are also applied to the electrode structures. As indicated in the figure, a first DC potential DC211-1 is applied to the first elongate electrode 211-1 above the ion region, while a DC potential DC211-N is applied to the Nth elongate electrode 211-N above the ion region. Similarly, a DC potential DC212-1 is applied to a first elongate electrode 212-1 below the ion region, and a DC potential DC212-N is applied to the Nth elongate electrode 212-N below the ion region. Additional DC potentials are applied to each of the other electrodes of the sets 211 and 212. These DC potentials are constant in time during the accumulation phase and varied during the elution phase and are used to create an electric DC field along the z-direction for controlling ions in the ion region, as discussed in more detail below.

An example of this embodiment has the following parameters, although those skilled in the art will understand that this is just an example, and that the parameters may be varied according to the application. Although the operating pressure of the TIMS may range from 10-5000 Pa (0.1-50 mbar), in this specific example it is approximately 300 Pa (3 mbar). The ion region has a length in the z-direction of 50 mm, a width in the y-direction of 75 mm and a height in the x-direction of 4 mm. In this version, the number of electrode structures 211 is 40 and the number of electrode structures 212 is 40. The RF potentials provide lateral confinement of the ions to the ion region in both the x and y directions, with RF1 having a frequency of 0.86 MHz and RF2 having a frequency of 1.2 MHz. The elongate electrodes are rounded rod electrodes, with a diameter of approximately 1.5 mm, and a spacing from adjacent electrode structures (both above and below the ion region) of 2.5 mm. The elongate electrodes are preferably integrated in a printed circuit board (PCB) and are supplied with DC and RF potentials via leads on the PCB. Finally, the gas flow rate is approximately 100 m/s.

Figure 2F:
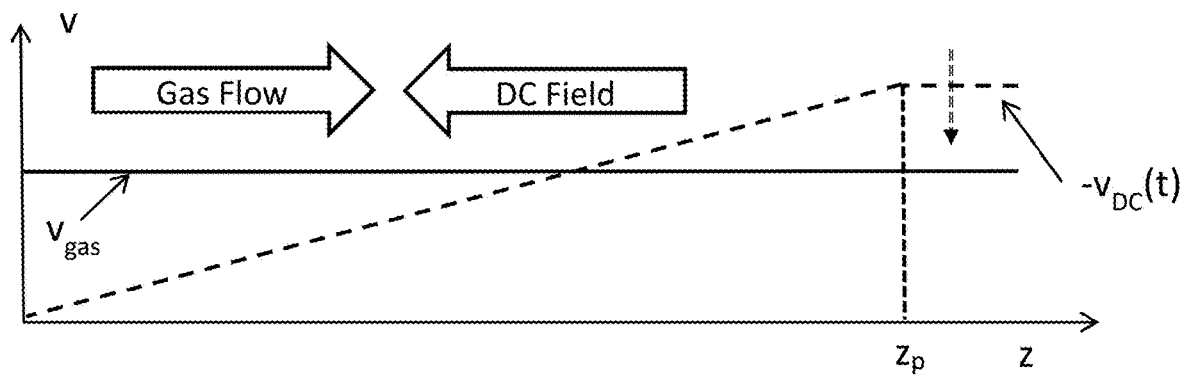
FIG. 2F is a graphical depiction of a gas flow velocity and the electric DC field gradient generated by the applied DC-potentials for the laterally extended TIMS of FIG. 2A.
Figure 2G:
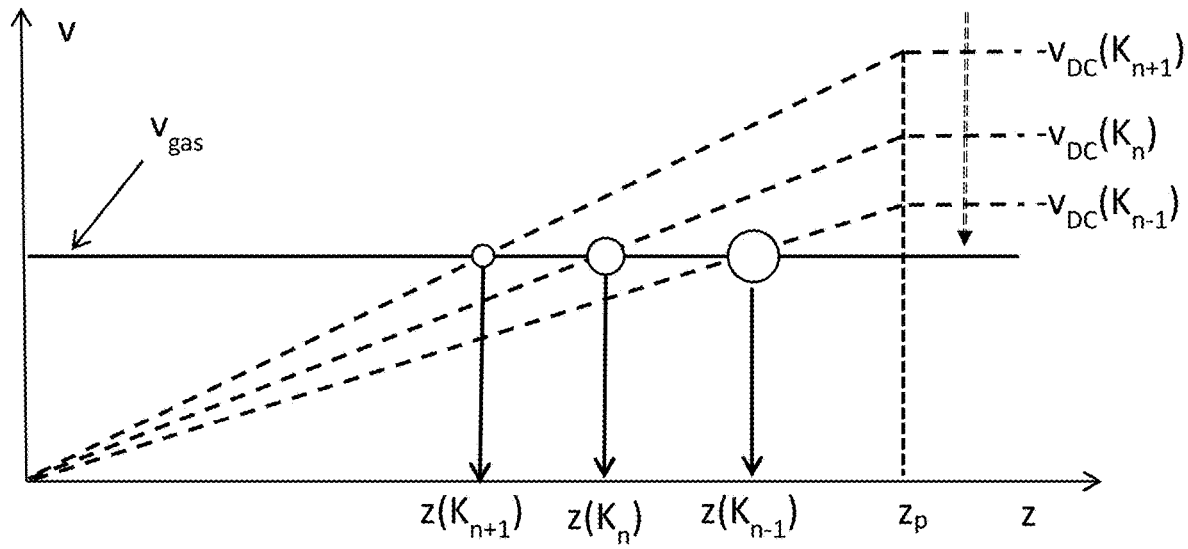
FIG. 2G is a graphical depiction similar to FIG. 2F, but which shows the effective velocity components of the electric DC field gradient for each of several ion species of different ion mobility.
Figure 2H:
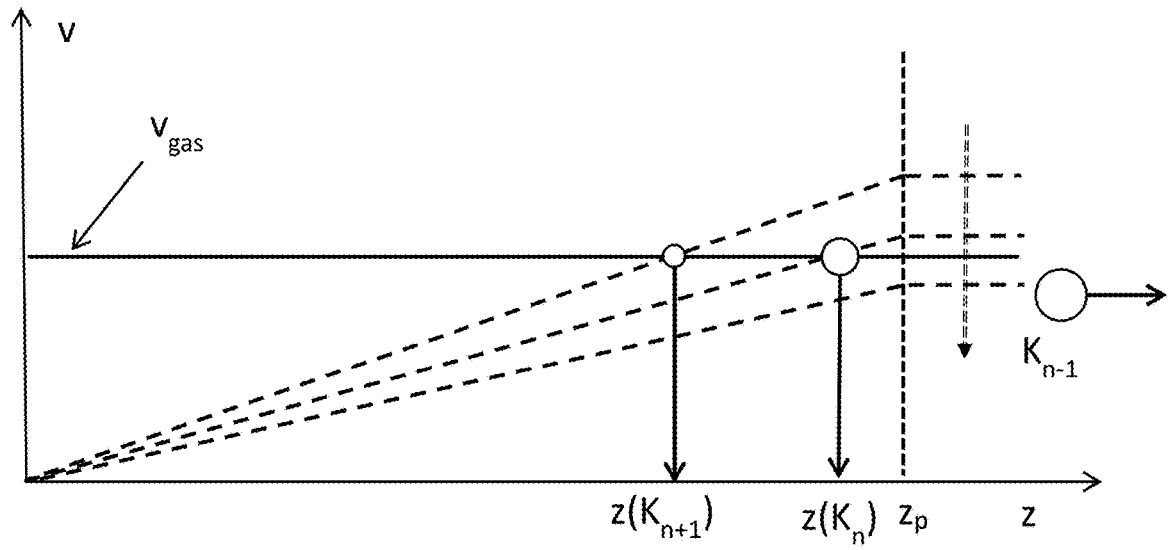
FIG. 2H is a graphical depiction similar to FIG. 2G, but which shows the elution of the different ion species of different ion mobility.

The effect of the opposing axial forces on the ions in the laterally extended TIMS 200 is shown in FIGS. 2F-2H, each of which is a graph of velocity (or an effective velocity component) versus position along the z-axis. As shown in FIG. 2F, there is a constant gas velocity, $v_{gas}$, pushing the ions through the ion region in the direction of the z-axis. Opposing this motion is an electric DC field $-E_{DC}(t)$ that has a spatial gradient along the z-axis, which produces the effective velocity component $-v_{DC}(t)$ shown in the figures, and which increases from zero to a maximum at longitudinal position $z_p$ at the plateau 203 which, as discussed below, may be an elution point for ions at which the ions are not trapped anymore in the laterally extended TIMS 200. The negative value of the electric DC field is due to its directional opposition to the longitudinal force of the gas, and it is represented as a function of time because, in this embodiment, the strength of the electric DC field is lowered during elution of the different ion species.

FIG. 2G is similar to FIG. 2F, but depicts the "effective" velocity component $-v_{DC}$ due to the counteracting electric DC field for each of several different ion species, $K_{n-1}$, $K_n$ and $K_{n+1}$. This "effective" velocity component is mobility dependent in the presence of a gas, and the corresponding $-v_{DC}$ gradient is therefore shown in the figure in broken lines for each of the ion species $K_{n-1}$, $K_n$ and $K_{n+1}$. These gradients represent the velocity components that would be imparted to the different ion species by the electric DC field $E_{DC}(t)$ in the absence of the gas flow $v_{gas}$. That is, $-v_{DC}$ represents the velocity component attributable to the electric DC field for an ion in a resting gas at a given pressure and temperature. This value is proportional to the strength of the electric DC field, and different for each ion species having a different mobility K (where $v_{DC}=K \cdot E_{DC}$). The "effective" velocity provided by the gas flow in the absence of the electric DC field is $v_{gas}$ for all ion species $K_{n-1}$, $K_n$ and $K_{n+1}$.

The electric DC field gradient along the z axis results in a corresponding gradient for $-v_{DC}$ that is different for ion species of different mobility, as shown in FIG. 2G. During an initial accumulation phase for the ions, the magnitude of the electric DC field is such that, for each of the ion species of interest, $-v_{DC}$ is equal and opposite to the velocity component $v_{gas}$ imparted by the gas flow at a different position along the z-axis. Because of the different $-v_{DC}$ gradients of the different ion species, the ions of the different species will be separated from one another and trapped at different respective positions along the z-axis. The different ion species, $K_{n-1}$, $K_n$ and $K_{n+1}$, are represented in FIG. 2G by circles of different sizes, the larger circles corresponding to ion species of larger cross-section and thus of lower mobility K.

Following separation of the different ion species, the ions may be sequentially eluted from the laterally extended TIMS 200 and directed to a downstream component of a hybrid IMS-MS system or to an ion detector. The elution is done by gradually reducing the magnitude of the electric DC field gradient, which correspondingly reduces the magnitudes of the $v_{DC}$ velocity component gradients, as shown in FIG. 2H. As these gradients are reduced, the point at which the counteracting velocity components $v_{gas}$ and $-v_{DC}$ cancel each other is shifted in the +z direction for each of the different ion species, toward the exit of the laterally extended TIMS 200. The structure of the electric field is such that the gradient increases in the +z direction until it reaches a plateau at the elution point $z_p$ along the z-axis. Since the ion trapping position is different for each of the different ion species, the shifting of these trapping positions by lowering of the electric DC field gradient results in each ion species arriving at the elution point $z_p$ at a different time. Upon arrival at the elution point, an ion species is no longer trapped by the counteracting velocity components and exits the laterally extended TIMS 200 in the +z direction, as shown for ion species $K_{n-1}$ in FIG. 2H. In this way, the separated ion species are eluted from the laterally extended TIMS 200 in a sequential manner, from low mobility to high mobility.

Shown in FIGS. 3A-3E is an alternative embodiment of the invention in which the electrode structures 304 include elongate electrodes above and below the ion region, but no extended portions like those of FIGS. 2A-2E. Rather, lateral electrodes are provided to either side of each of the elongate electrodes to provide ion confinement in the y dimension. This embodiment also uses a housing with an extended width in the y-direction to allow for a more consistent gas flow through the ion region.

Figure 3A:
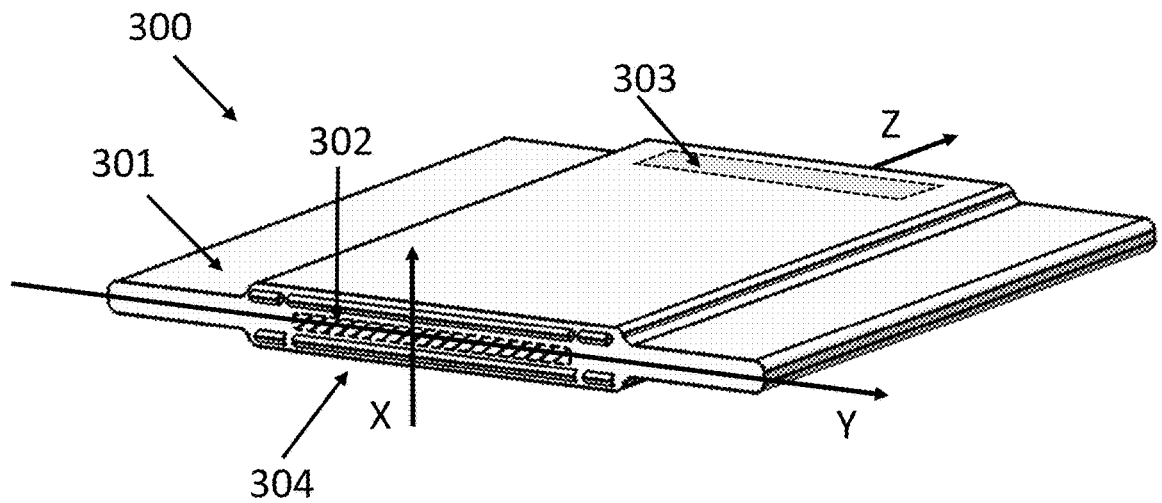
FIG. 3A shows a laterally extended TIMS according to the present invention using RF-potentials of different frequency and electric DC-potentials to confine ions inside an ion region and generating a gas flow and an electric DC field gradient as first and second axial force.

FIG. 3A shows the laterally extended TIMS 300 of this embodiment, which has an ion region 302 with an elongate cross-sectional profile and a plateau region 303. As shown, housing 301 has portions on either side in the y-direction that extend significantly further than the electrode structures and the ion region 302. These side regions of the housing accommodate gas flow through the housing, but not ion travel. An advantage of this configuration is that the gas flow through the ion region is relatively uniform along the y-direction, as any disruptions in that flow tend to be within the side portions of the housing, close to the edges of the housing in the y-direction. Thus, in this embodiment, the width of the housing 301 is greater than the width of the ion region 302.

Figure 3B:
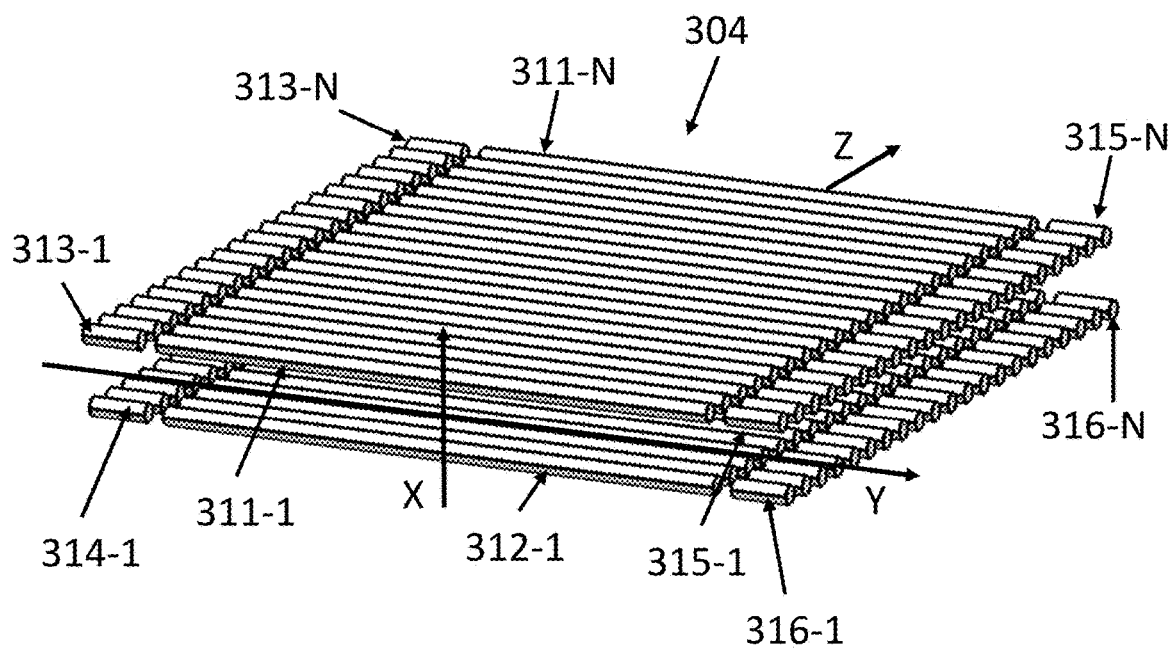
FIG. 3B is a schematic, perspective view of the electrode structures of the laterally extended TIMS of FIG. 3A, wherein each electrode structure comprises three electrodes.

An isolated view of the electrode structures 304 is shown in FIG. 3B. The electrode structures include, above the ion region, elongate electrodes 311 (including individual electrodes 311-1 to 311-N), and lateral electrodes 313 and 315 (including, respectively, individual lateral electrodes 313-1 to 313-N and 315-1 to 315-N). Below the ion region are elongate electrodes 312, and lateral electrodes 314 and 316. Those skilled in the art will understand that these electrodes are parallel along the x-direction to the electrodes 311, 313 and 315, respectively, and therefore follow the same pattern. Preferably, the electrodes above the ion region (311, 313, 315) have a spatial offset relative to the electrodes below the ion region (312, 314, 316) along the z-direction. The electrodes above and below the ion region have a regular relative spacing along the z-direction, but the z-direction positioning of the electrodes below the ion region (312, 314, 316) is preferably offset from the z-direction positioning of the electrodes above the ion region (311, 313, 315) by a distance equal to half of this relative spacing. In an amended configuration, the electrodes above the ion region (311, 313, 315) have no spatial offset relative to the electrodes below the ion region (312, 314, 316) along the z-direction.

Figure 3C:
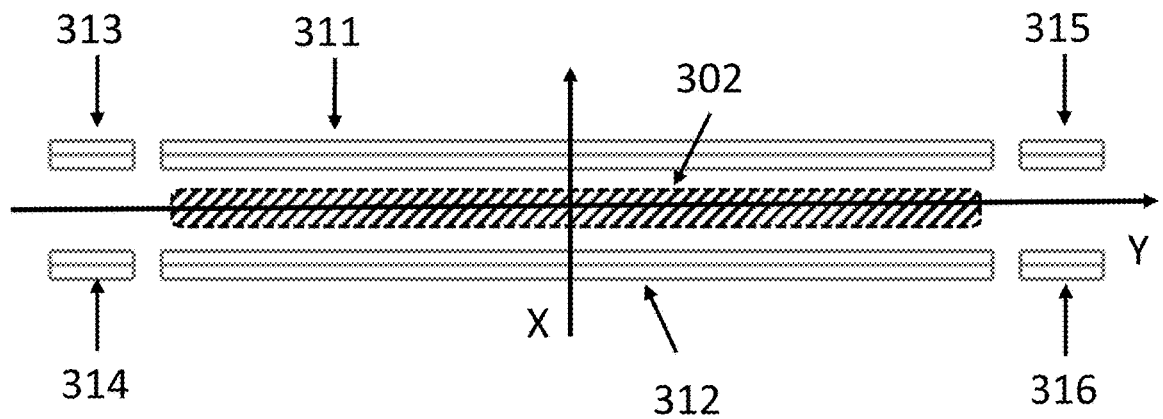
FIG. 3C is a schematic, cross-sectional view of the electrode structures of FIG. 3B.
Figure 3D:
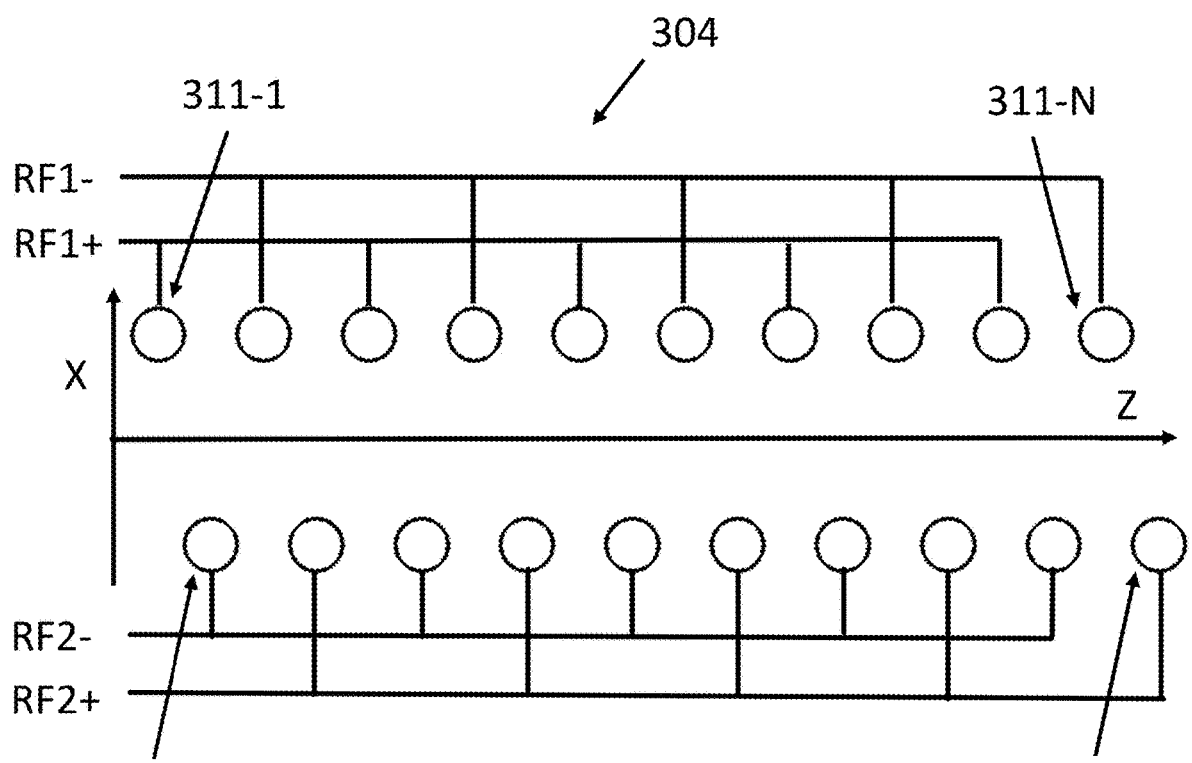
FIG. 3D shows the electrodes of the electrode structures of FIGS. 3A-3C supplied with RF-potentials.

As shown in FIG. 3C, the ions are confined to the ion region 302 by electrical potentials on the elongate electrodes 311, 312 and the lateral electrodes 313, 315, 314 and 316. In a preferred version of this embodiment, two different RF potentials RF1 and RF2 are used, with RF1 being applied to the elongate electrodes 311, and RF2 being applied to the elongate electrodes 312. As in the embodiment of FIG. 2D, two opposite phases of the RF signals are used. In the example shown in FIG. 3D, a first phase of RF1 (RF1+) is applied to every other electrode structure 311, while an opposite phase, RF1− (which is 180° out of phase with RF1+) is applied to the other electrode structures 311. Similarly, a first phase of RF2 (RF2+) is applied to every other electrode structure 312, while an opposite phase, RF2−, is applied to the remaining electrode structures 312.

Figure 3E:
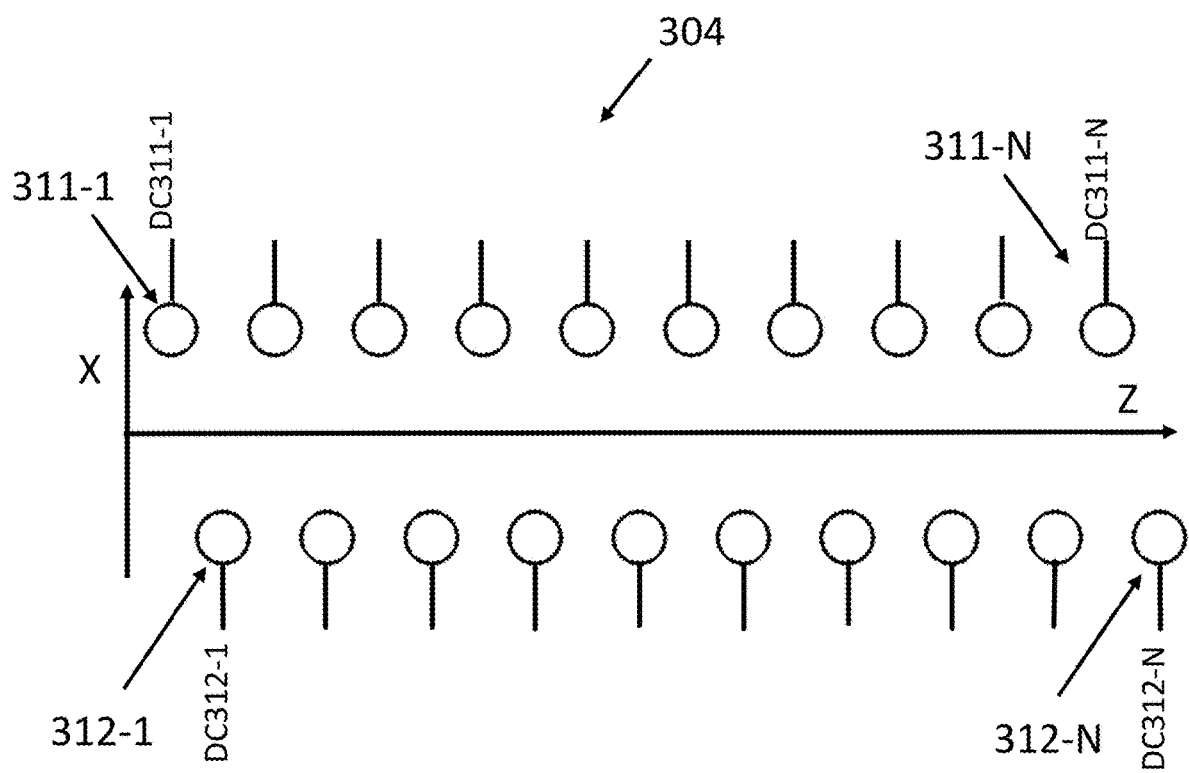
FIG. 3E shows the electrodes of the electrode structures of FIGS. 3A-3C supplied with DC potentials that generate an electric DC field gradient along the axis of the TIMS.

As shown in FIG. 3E, DC potentials are also applied to the elongate electrodes of the electrode structures. As indicated in the figure, a DC potential DC311-1 is applied to the first elongate electrode 311 above the ion region, while a DC potential DC311-N is applied to the Nth elongate electrode 311 above the ion region. Similarly, a DC potential DC312-1 is applied to a first elongate electrode 312 below the ion region, and a DC potential DC312-N is applied to the Nth elongate electrode 312 below the ion region. Additional DC potentials are applied to each of the other electrodes of the sets 311 and 312. These DC potentials may be used to create an electric DC field along the z-direction for controlling ions in the ion region, as discussed in more detail below.

In addition to the DC potentials applied to the elongate electrodes 311, 312, DC confinement potentials are also applied to the lateral electrodes 313, 315, 314 and 316. Unlike the DC potentials applied to the elongate electrodes, the DC potentials applied to the lateral electrodes serve to confine the ions to the ion region in the y-direction. As such, although the values of these DC potentials may vary along the z-direction, they are typically arranged in the same manner at each electrode position along the z-direction. The DC potential applied to one of the lateral electrodes 313, 315, 314 and 316 has preferably an DC offset compared to the DC potential of its adjacent elongate electrode. The DC offset between the lateral electrodes and their corresponding adjacent elongate electrodes can be constant or vary along the z-direction.

An example of this embodiment has the following parameters, although those skilled in the art will understand that this is just an example, and that the parameters may be varied according to the application. As with the embodiment of FIGS. 2A-2E, the operating pressure of the TIMS may range from 10-5000 Pa (0.1-50 mbar), while in this specific example it is approximately 300 Pa (3 mbar). The ion region has a length in the z-direction of 105 mm, a width in the y-direction of 75 mm and a height in the x-direction of 4 mm. In this version, the total number of electrode structures 311, 312 is 70. The RF potentials provide lateral confinement of the ions to the ion region in the x direction, with RF1 having a frequency of 1.2 MHz and RF2 having a frequency of 1.8 MHz. Confinement in the y-direction, however, is provided by the DC potentials applied to lateral electrodes 313, 315, 314 and 316, e.g., by a constant DC offset of 1-5 V relative to the corresponding DC potentials DC311 and DC312, respectively. The elongate electrodes are rounded rod electrodes, with a diameter of approximately 1.0 mm, and a spacing from adjacent electrode structures (both above and below the ion region) of 1.5 mm. The elongate electrodes are preferably integrated in a printed circuit board (PCB) and are supplied with DC and RF potentials via leads on the PCB. Finally, the gas flow rate is approximately 100 m/s.

Figure 4A:
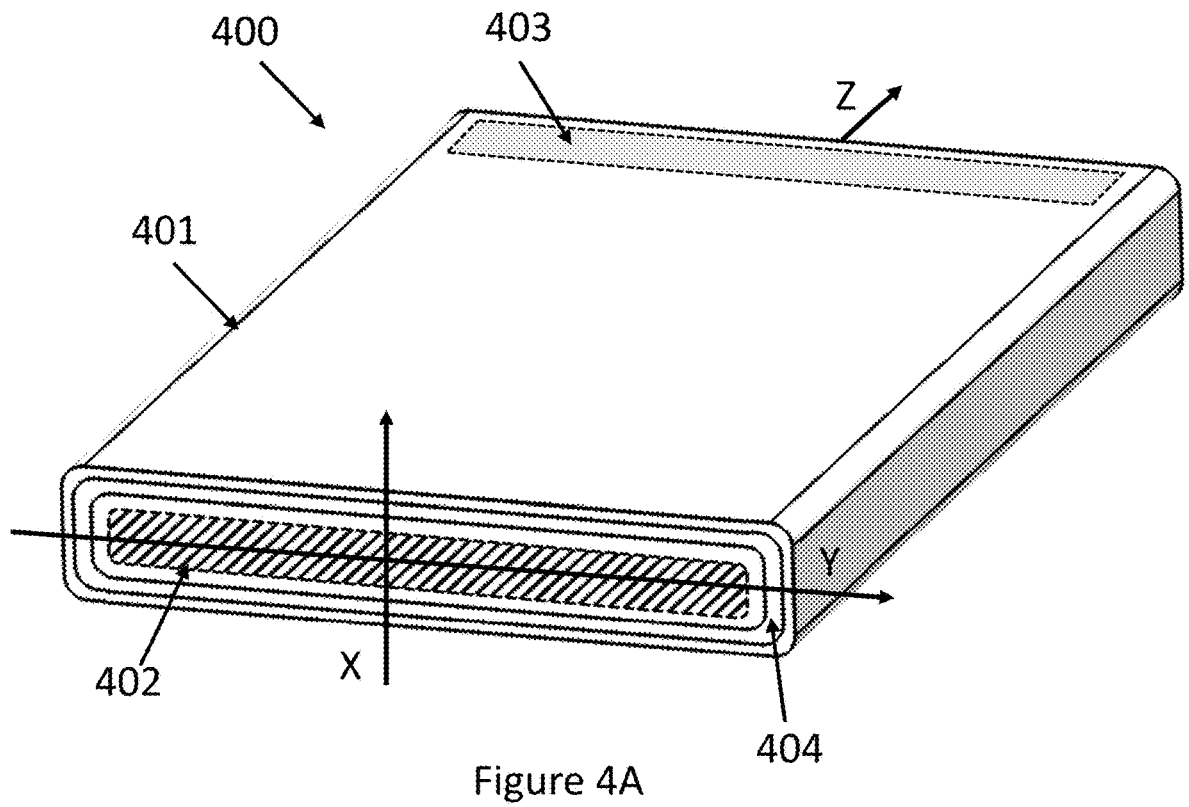
FIG. 4A shows a laterally extended TIMS according to the present invention using RF-potentials of one frequency to confine ions inside an ion region and generating an axial transient electric DC field and an electric DC field gradient as first and second axial forces.
Figure 4B:
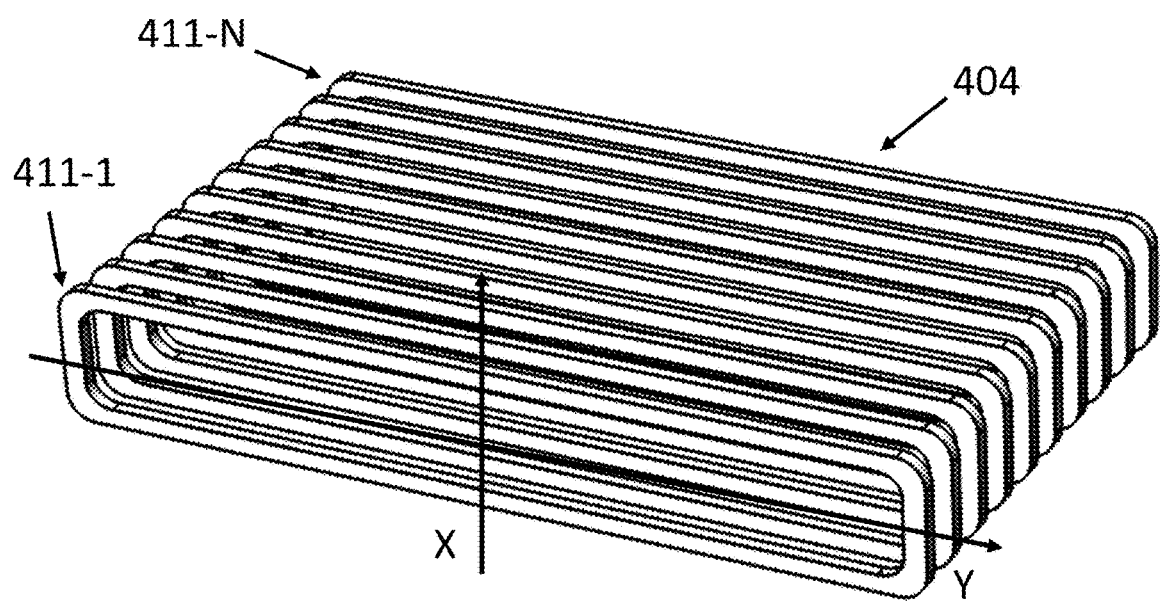
FIG. 4B shows a set of electrode structures of the laterally extended TIMS of FIG. 4A, wherein each electrode structure comprises a single electrode.

FIGS. 4A-4G show an alternative embodiment of the invention. The laterally extended TIMS 400 comprises a series of electrode structures 404 wherein each electrode structure 404 has a single electrode which surrounds the ion region 402 in the x and y directions. As shown in FIG. 4A, a housing 401 surrounds the electrode structures 404 from an entrance of the laterally extended TIMS 400 to a plateau region 403 near an exit. The individual electrodes 411 are closed loop electrodes that fully encompass the ion region 402. The electrodes are parallel and equally spaced along the z-direction, as shown in FIG. 4B, ranging from a first electrode 411-1 to an Nth electrodes 411-N.

Figure 4C:
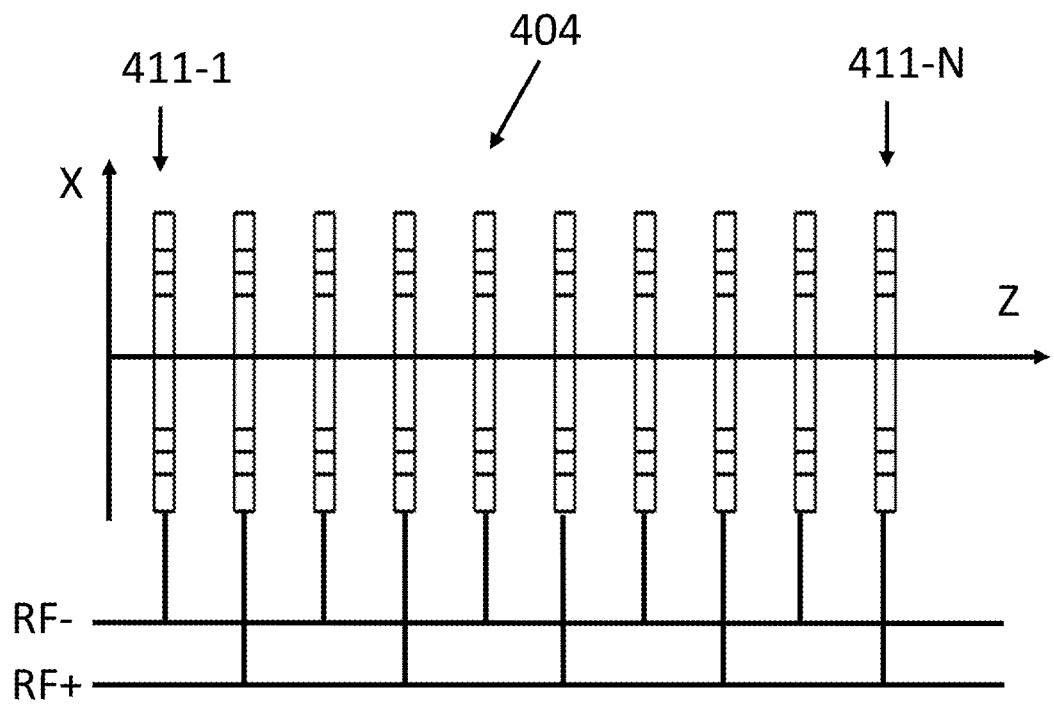
FIG. 4C shows how the electrodes of the electrode structures of FIG. 4B are supplied with RF potentials.
Figure 4D:
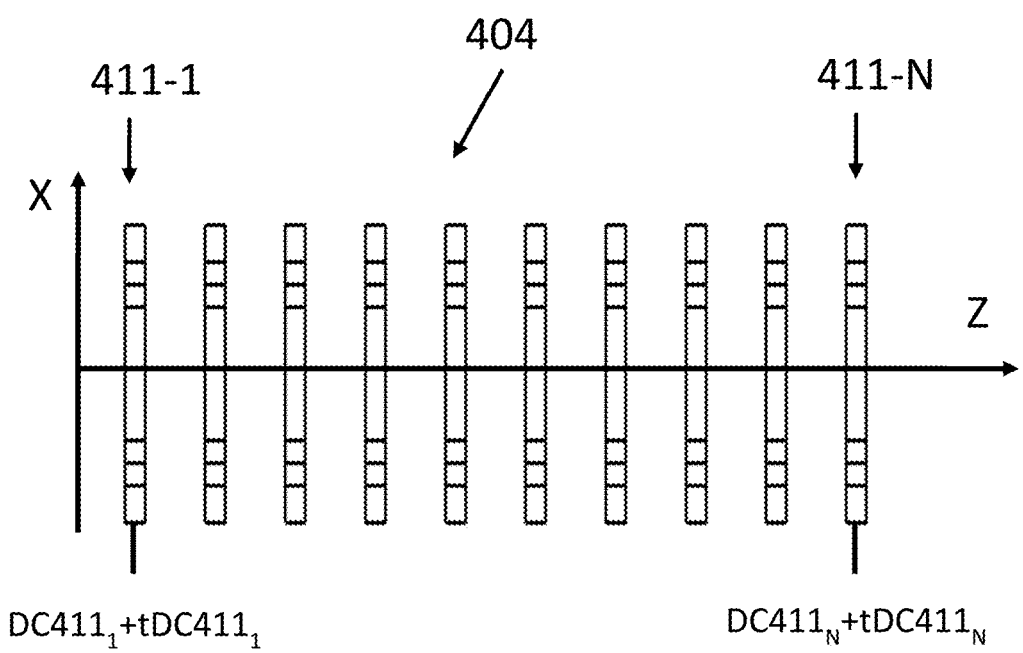
FIG. 4D shows how the electrodes of the electrode structures of FIG. 4B are supplied with DC potentials and transient DC potentials, wherein an electric DC field gradient is generated by the DC potentials and an axial transient electric DC field is generated by the transient DC potentials.

FIG. 4C shows how RF potentials are applied to the electrodes 411, with a first phase of the RF potential being applied to every other electrode, and an opposite phase (180° out of phase with the first phase) being applied to the remaining electrodes. This application of alternating phases along the series of electrodes 411 helps to keep the ions confined to the ion region. Different DC potentials are also applied to the electrodes 411, as shown in FIG. 4D, the DC potentials each including a first component that is constant in time during the accumulation phase and varied during the elution phase, as well as a second, transient component. Thus, as shown in the figure, a potential of $DC411_1 + tDC411_1$ is applied to the electrode 411-1, where $DC411_1$ is the first component and $tDC411_1$ is the transient component. Similarly, a potential of $DC411_N + tDC411_N$ is applied to the electrode 411-N, where $DC411_N$ is the first component, and $tDC411_N$ is the transient component. Those skilled in the art will understand that similar combinations of a first DC potential component and a transient DC potential component are also applied to the other electrodes. The first components are constant in time during the accumulation phase and varied during the elution phase. They are used to create an electric DC field gradient along the z-direction for controlling ions in the ion region, as discussed in more detail below. The transient DC potentials create a travelling wave (TW) which moves downstream along the z-axis.

Figure 4E:
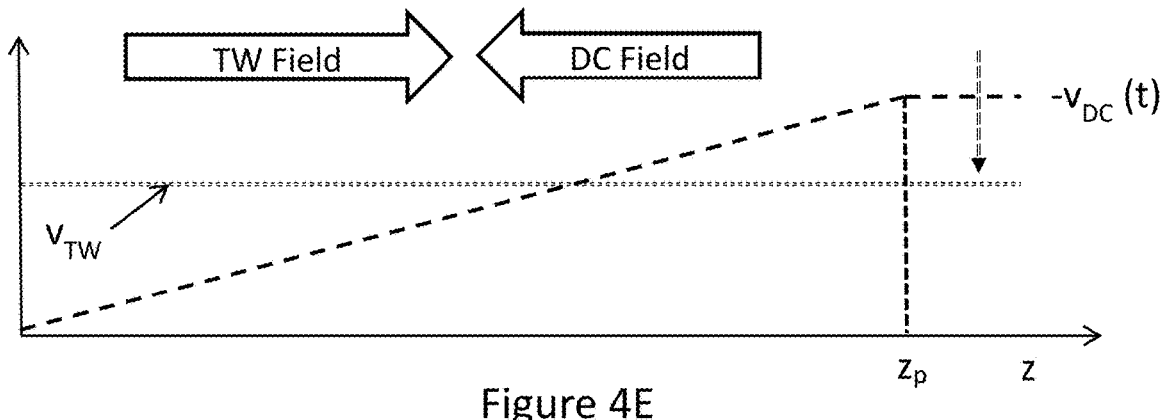
FIG. 4E is a graphical depiction of how the DC potentials and transient DC potentials shown in FIG. 4D provide opposing traveling wave and DC field forces for the laterally extended TIMS of FIG. 4A.
Figure 4F:
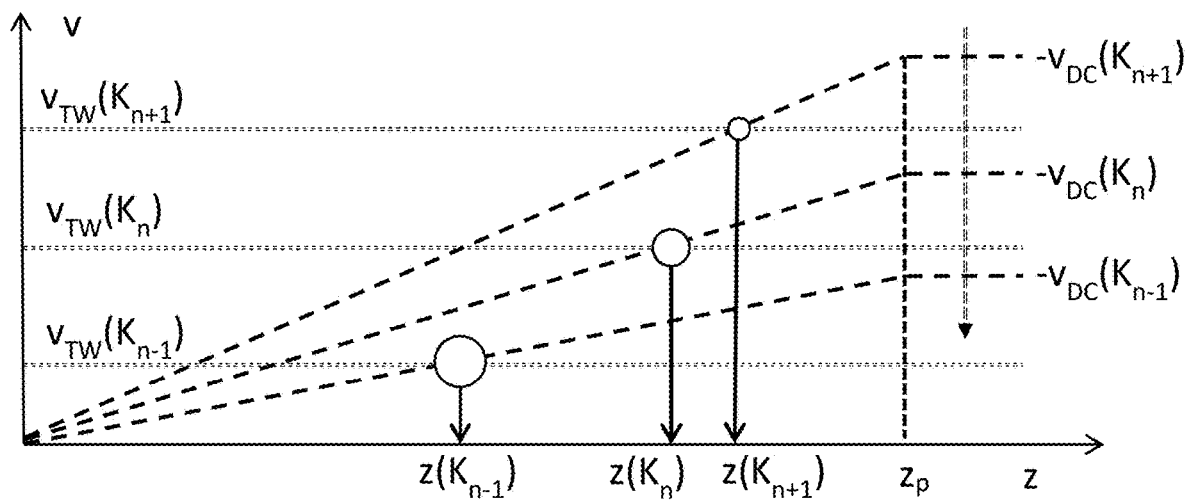
FIG. 4F is a graphical depiction similar to FIG. 4E, but which shows the effective velocity components of the axial transient electric DC field and the electric DC field gradient for each of several ion species of different ion mobility.
Figure 4G:
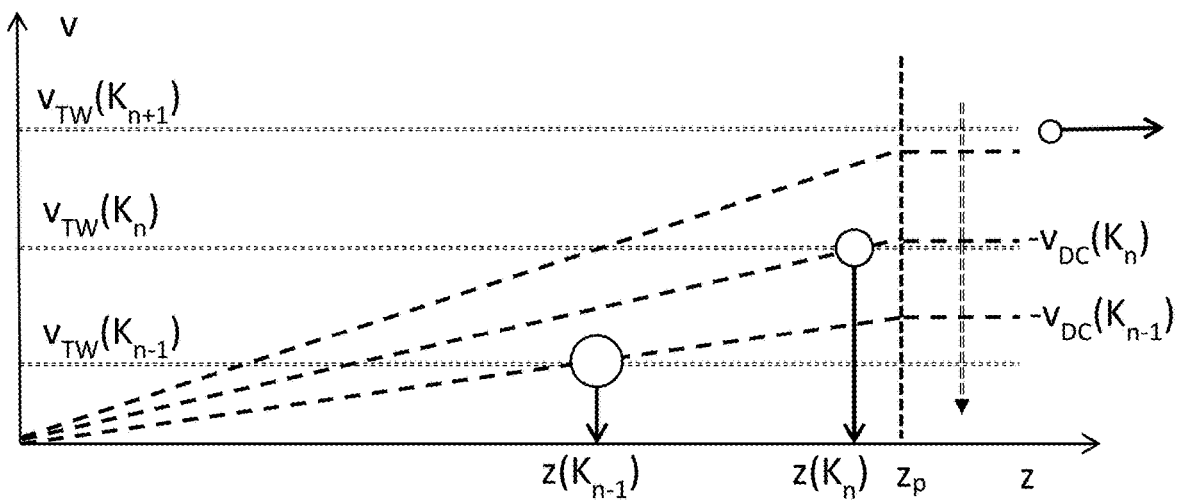
FIG. 4G is a graphical depiction similar to FIG. 4F, but which shows the elution of the different ion species of different ion mobility.

The effect of the opposing axial forces on the ions in the laterally extended TIMS 400 is shown in FIGS. 4E-4G, each of which is a graph of velocity (or an effective velocity component) versus position along the z-axis. The embodiment of FIGS. 4A-4G differs from earlier embodiments in that there is no gas flow used as an axial force on the ions. Instead, the DC potentials applied to the electrodes 411 provide both a DC gradient along the z-direction and a traveling wave (TW) field that opposes it. In the example shown in FIG. 4E, the traveling wave field provides an essentially constant velocity component to the ions (shown as $v_{TW}$) that opposes the velocity component created by the DC gradient field. Because there is a residual gas in the housing 401 of the TIMS, the mobility K of each ion will determine its relative positioning along the z-direction.

Since the effect of the electric DC field gradient on the ions is mobility dependent, the velocity component gradients are different for the different ion species $K_{n-1}$, $K_n$ and $K_{n+1}$, as shown in FIG. 4F. Moreover, because the axial velocity component $v_{TW}$ generated by the axial transient DC potentials applied to the electrode structures 411-1 to 411-N are also mobility dependent, the different magnitudes of these components are also shown for the different ion species. During an ion accumulation phase, the opposing forces are balanced so that the ions are trapped with ion species of different ion mobilities K at different axial positions within the laterally extended TIMS 400. Because higher mobility ion species are less influenced by the presence of the resting gas in the laterally extended TIMS 400, the equilibrium point between the counteracting forces for those ion species is closer to the elution point $z_p$, while the ion species of lower mobility will be trapped closer to the entrance of the laterally extended TIMS 400.

The laterally extended TIMS 400 is operated at a pressure of approximately 100 Pa (1 mbar) and has a length of 150 mm, a width of 50 mm and a height of 4 mm. Elution of the ions in this embodiment is done by gradually reducing the magnitude of the electric DC field. This will result in the sequential elution of the ion species from higher mobility to lower mobility. As shown in FIG. 4G, relatively high ion mobility species $K_{n+1}$ exits the laterally extended TIMS 400, while the lower mobility ions remain trapped. Eventually, all of the ions are eluted, and are transferred to a downstream component of a hybrid IMS-MS system or to an ion detector.

An example of this embodiment has the following parameters, although those skilled in the art will understand that this is just an example, and that the parameters may be varied according to the application. The operating pressure of the TIMS may range from 10-5000 Pa (0.1-50 mbar), while in this specific example it is approximately 100 Pa (1 mbar). The ion region has a length in the z-direction of 150 mm, a width in the y-direction of 50 mm and a height in the x-direction of 4 mm. In this version, there are 125 electrodes 411 used in the electrode structures. The RF potentials provide lateral confinement of the ions to the ion region in both the x and y directions, with an RF frequency of 1.0 MHz. Each electrode 411 is spaced from adjacent electrodes by about 1.2 mm. The elongate electrodes are preferably integrated in a printed circuit board (PCB) and are supplied with DC and RF potentials via leads on the PCB.

Figure 5A:
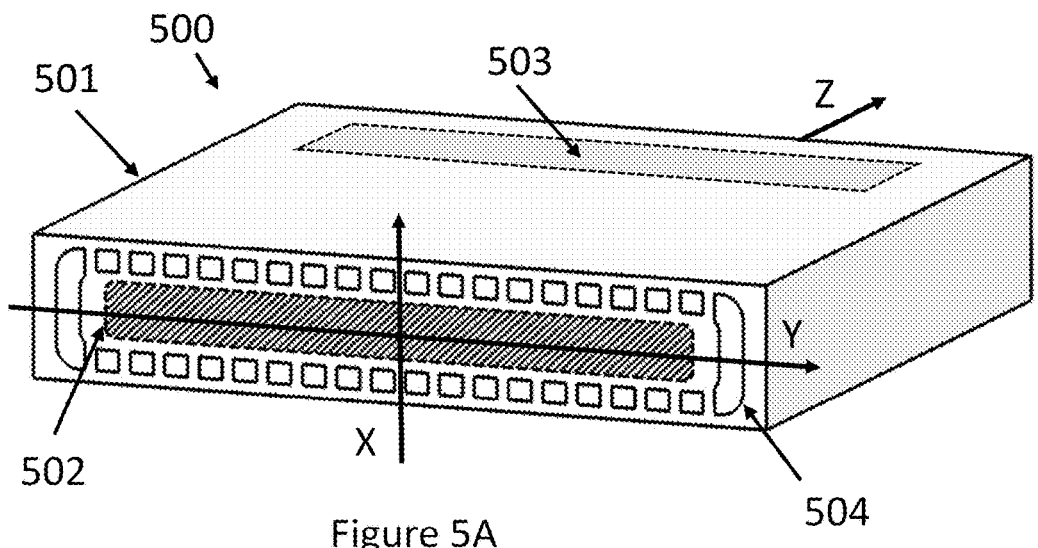
FIG. 5A shows a laterally extended TIMS according to the present invention using transient electric DC potentials and static DC potentials to confine ions inside an ion region and generating a gas flow and an electric DC field gradient as first and second axial forces.
Figure 5B:
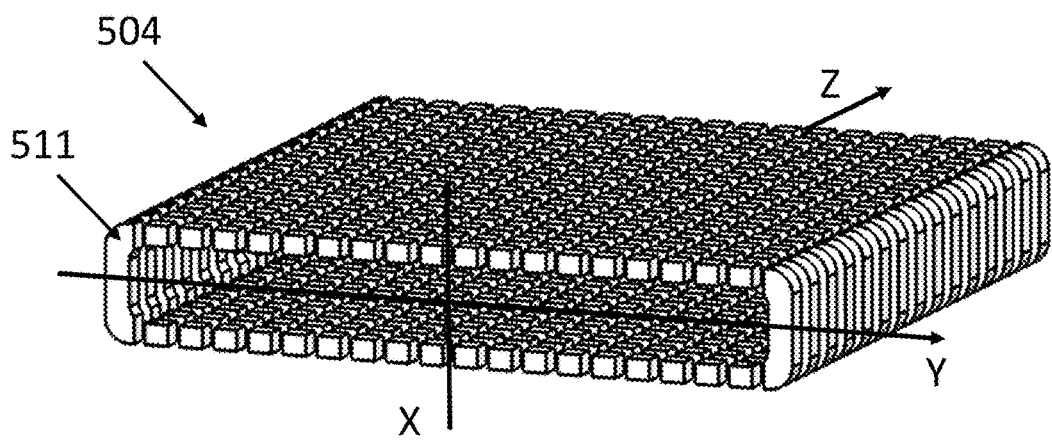
FIG. 5B shows a set of electrode structures of the laterally extended TIMS of FIG. 5A, wherein each electrode structure comprises a set of electrodes.

FIGS. 5A-5F show an alternative embodiment of the invention. The laterally extended TIMS 500 shown in FIG. 5A comprises a housing 501 and a series of electrode structures 504. The electrode structures 504 extend from an entrance of the laterally extended TIMS 500 to a plateau region 503 near an exit. As shown in FIG. 5B, each one of the electrode structures 504 comprises a set of electrodes 511. The electrodes of the electrode set 511 collectively encompass the ion region 502 in the x and y directions.

Figure 5C:
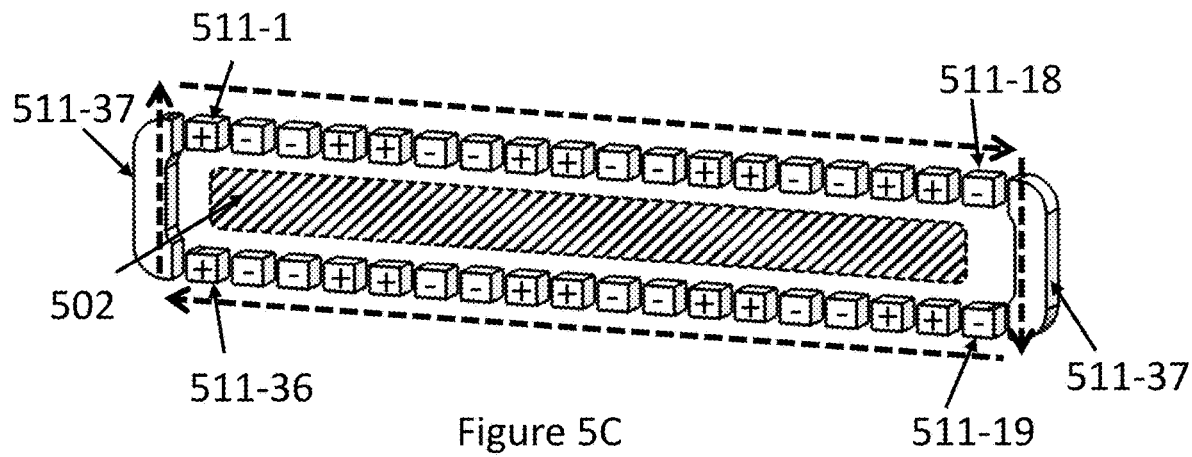
FIG. 5C shows a single electrode structure of FIG. 5B that comprises a set of electrode components, including small electrode components above and below the ion region to which transient electric DC potentials are applied, and end electrode components to which a static DC potential is applied.

As shown in FIG. 5C, the set of electrodes 511 comprises small, uniform electrodes above (511-1 to 511-18) and below (511-19 to 511-36) the ion region 502, with larger electrodes 511-37 located to either end of the ion region 502 in the y-direction. Each of the electrode structures 504 has the same electrode configuration, but different DC potentials can be applied to each one of the individual electrodes, i.e., a DC potential is applied to each of the small electrodes of a single electrode structure. These DC potentials applied to the small electrodes of the electrode structures are constant in time during the accumulation phase and are varied during the elution phase. They are used to create an electric DC field gradient along the z-direction for controlling ions in the ion region 502, as discussed in more detail below.

An example of how the electrodes (511-1 to 511-37) can be provided with additional electrical DC potentials to confine the ions laterally inside the ion region 502 is shown in FIG. 5C. The electrodes of the electrode set 511 are labeled, with small electrodes identified as electrodes 511-1 to 511-36, and the larger electrodes on the ends identified as electrodes 511-37. Thus, in this example, there are eighteen small electrodes above the ion region, and eighteen small electrodes below it. Each small electrode (511-1 to 511-36) is labeled either "+" or "−" which indicates that additional DC potentials are applied to the small electrodes which are either highly repelling (+) or less repelling (−) to ions in the ion region. These additional DC potentials on the small electrodes 511-1 to 511-36 are changed dynamically according to a predetermined sequence, while the DC potentials applied to the large electrodes 511-37 are constantly repelling. The changing of the additional DC potentials on the small electrodes simulates the rotation of those potentials around the electrode set 511 in the direction indicated by the broken line arrows. That is, in each progressive time period, a small electrode is given the additional DC potential that was applied in the previous time period to the small electrode that is adjacent in a direction opposite to the direction of the arrows. In this way, the high and low additional potentials rotate around the electrode structure over time. The rotation of the additional DC potentials on the electrode structures provides a lateral confining force in the x-direction on the ions within the portion of the ion region 502 to the interior of the electrode set 511, while the additional DC potentials applied to the large electrode provide a lateral confining force in the y-direction.

Figure 5D:
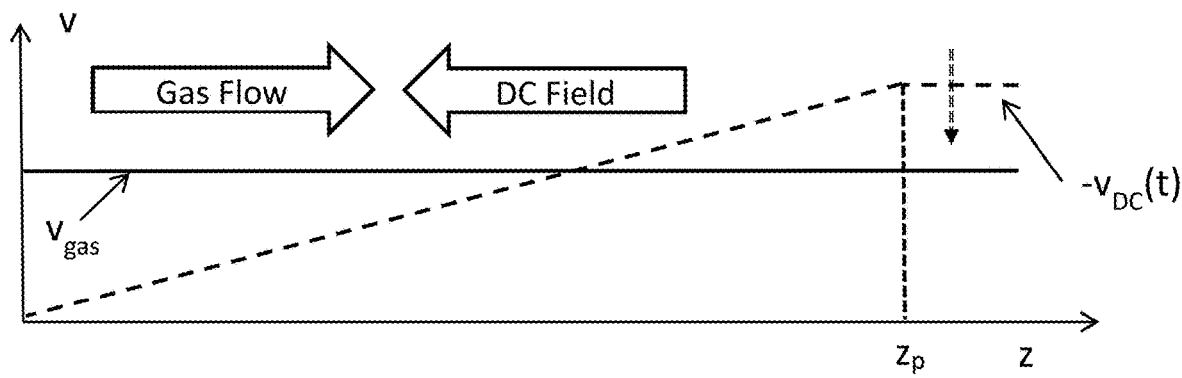
FIG. 5D is a graphical depiction of a gas flow velocity and the electric DC field gradient generated by DC potentials applied to the electrode structures of the laterally extended TIMS of FIG. 5A.
Figure 5E:
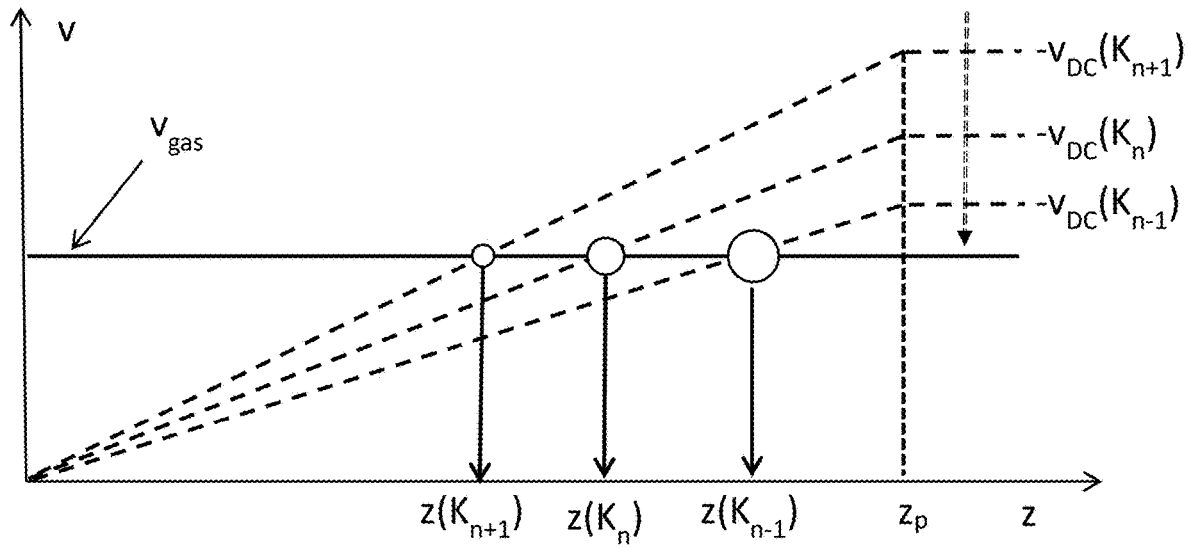
FIG. 5E is a graphical depiction similar to FIG. 5D, but which shows the effective velocity components of the electric DC field gradient for each of several ion species of different ion mobility.
Figure 5F:
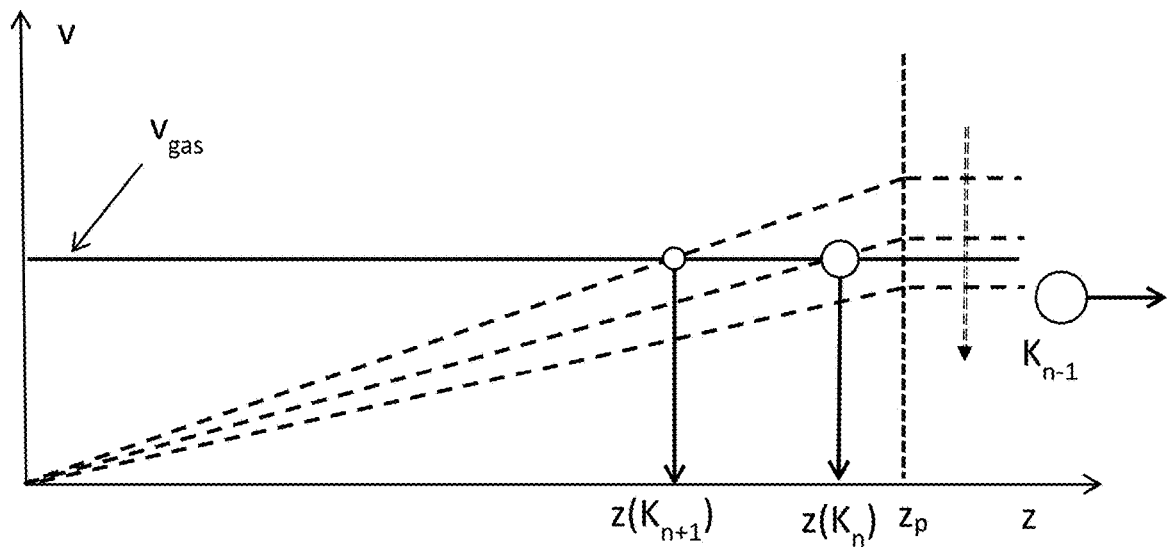
FIG. 5F is a graphical depiction similar to FIG. 5E, but which shows the elution of the different ion species of different ion mobility.

The effect of the opposing axial forces on the ions in the laterally extended TIMS 500 is shown in FIGS. 5D-5F, each of which is a graph of velocity (or an effective velocity component) versus position along the z-axis. As shown in FIG. 5D, the electric DC field gradient, which is generated by the DC potentials individually applied to each of the electrode structures 504 along the z-direction, opposes a constant gas flow, thereby establishing the desired accumulation and separation of ions by mobility along the z-direction. These individual DC potentials may thereafter be changed so as to lower the electric DC field gradient such that the ion species elute from the laterally extended TIMS 500 by mobility, as shown in FIGS. 5E and 5F which are equivalent to FIGS. 2F to 2H explained above. Eventually, all ion species are eluted and transferred to a downstream component of a hybrid IMS-MS system or to an ion detector. During the accumulation and elution phase, the rotation of the additional DC potentials applied to the small electrodes and the repelling DC potentials applied to large electrodes are maintained which provides the desired lateral confinement.

An example of the laterally extended TIMS 500 is operated at a pressure of approximately 20,000 Pa (200 mbar) and has a length of 50 mm, a width of 50 mm and a height of 5 mm, although those skilled in the art will understand that this is just an example, and that the parameters may be varied according to the application. In this version, there are fifty electrode structures 504 used, each consisting of thirty-six small electrodes and two end electrodes. The additional DC potentials on the small electrode components change between a repelling potential value (+V) and zero Volt (−V), and provide lateral confinement of the ions to the ion region in x-direction. The repelling potential values is less than 500V. The DC potentials at the large electrodes have an DC offset to the DC potentials applied to the small electrodes for generating the electric DC field gradient and provide lateral confinement of the ions to the ion region in y-direction. The "rotation" of the DC voltage potentials around each electrode may be up to 2000 m/s, depending on the operating pressure. The electrodes are preferably integrated into one or more printed circuit boards (PCBs) and are supplied with DC potentials via leads on the PCB. Finally, the velocity of the gas flow is between five and twenty m/s.

Figure 6A:
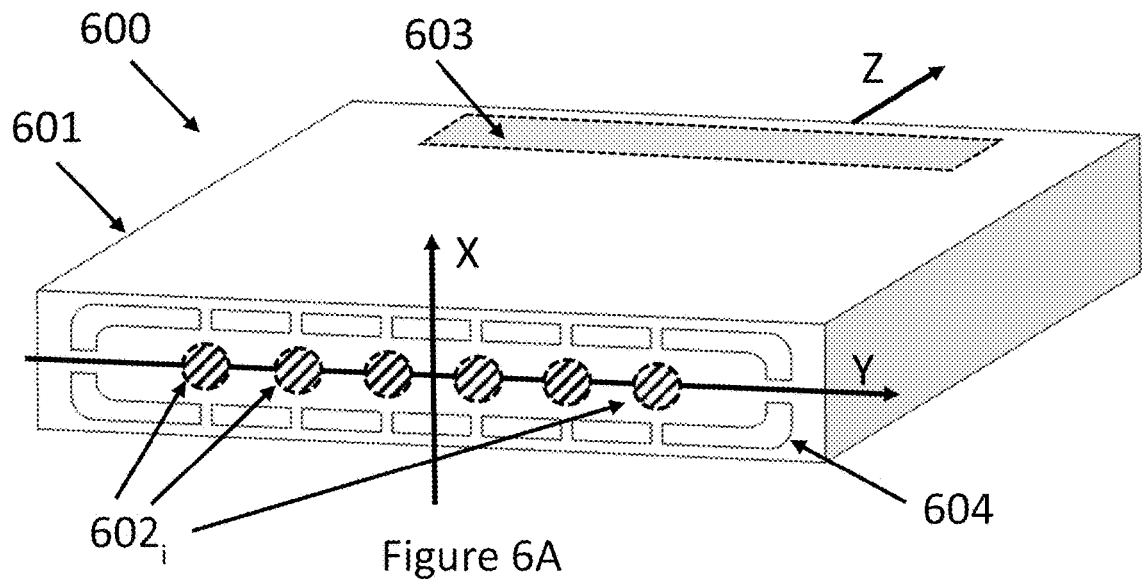
FIG. 6A shows a laterally extended TIMS according to the present invention that uses RF-potentials of a single frequency to confine ions inside multiple ion channels and that generates a gas flow and an electric DC field gradient as first and second axial forces.
Figure 6B:
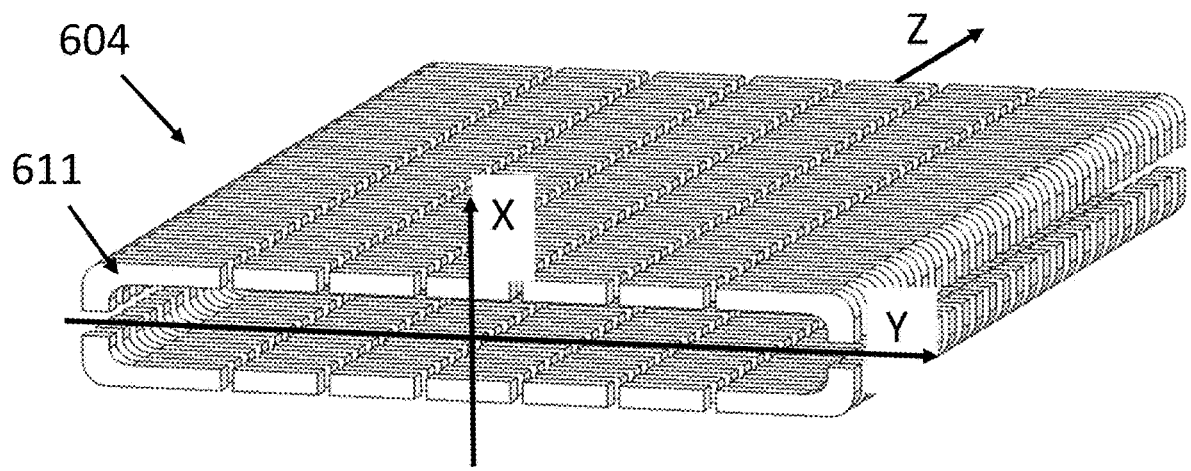
FIG. 6B is a schematic, perspective view of a set of electrode structures of the laterally extended TIMS of FIG. 6A, wherein each electrode structure comprises a set of electrode segments.

FIGS. 6A-F show an alternative embodiment of the invention. The laterally extended TIMS 600 shown in FIG. 6A comprises a housing 601 and a series of electrode structures 604. The electrode structures 604 extend from an entrance of the laterally extended TIMS 600 to a plateau region 603 near an exit. As shown in FIG. 6B, each electrode structure 604 comprises a set of electrodes 611. The electrodes of the electrode set 611 collectively encompass an ion region in the x and y directions.

Figure 6C:
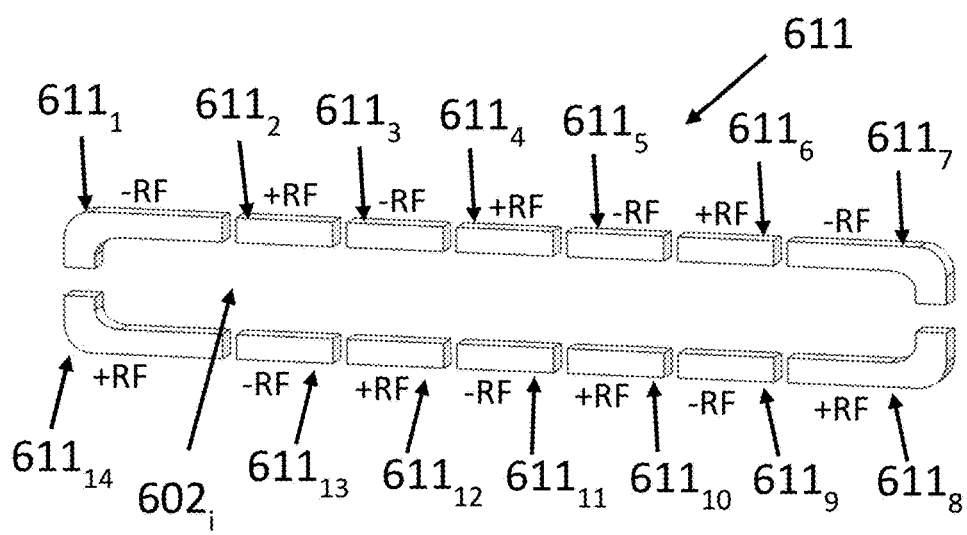
FIG. 6C shows a single electrode structure of FIG. 6B comprising a set of electrode segments to which RF potentials of opposite phase are applied to generate multiple ion channels.

The embodiment shown in FIGS. 6A to 6F differs from earlier embodiments in that, within the ion region, the ions are organized along the y-direction into a series of separate ion channels 602-i. As shown in FIG. 6C, the set of electrodes 611 provides electrodes 611-1 to 611-7 above and electrodes 611-8 to 611-14 below the ion channels 602-i, wherein opposite phases of an RF potential are applied to the electrodes 611-1 to 611-14 in an alternating fashion. Thus, a first electrode component (611-1) is provided with potential −RF, while the adjacent electrodes 611-2 and 611-14 are provided with the opposite phase +RF (which is 180° out of phase with −RF). This alternating application of the RF potential continues around the circumference of the electrode set 611, and confines ions in the ion region to the different ion channels 602-i. Each electrode structure uses the same application of the same RF potentials, such that the ion channels 602-i continue along the z-direction. In this way, the laterally extended TIMS 600 functions as a collection of multiple, parallel TIMS, each represented by a different one of the ion channels. Different DC potentials are applied to the different, respective electrode structures 604, although a common DC potential is applied to all electrodes of a single electrode structure. These DC potentials applied to the electrode structures 604 are constant in time during the accumulation phase and are varied during the elution phase. They are used to create an electric DC field gradient along the z-direction for controlling ions in the ion region, as discussed in more detail below.

Figure 6D:
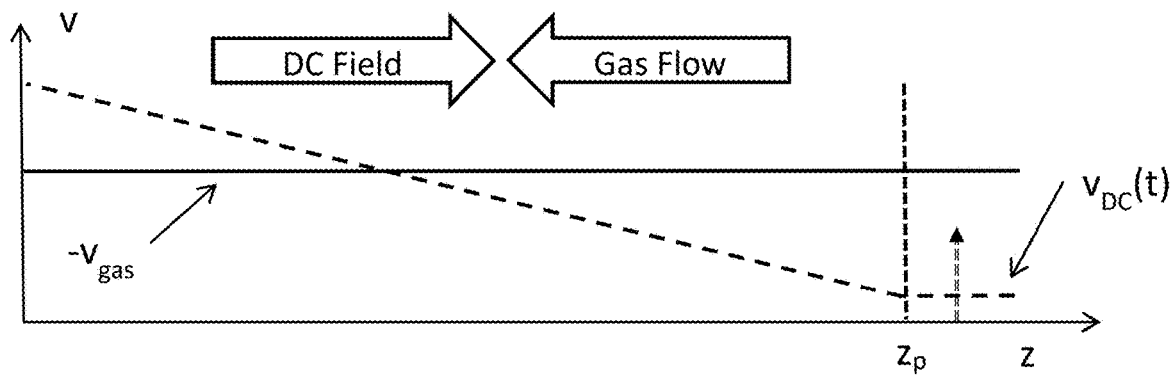
FIG. 6D is a graphical depiction of a gas flow velocity and the electric DC field gradient generated by the DC-potentials applied to the electrode structures of the laterally extended TIMS of FIGS. 6A-6C.
Figure 6E:
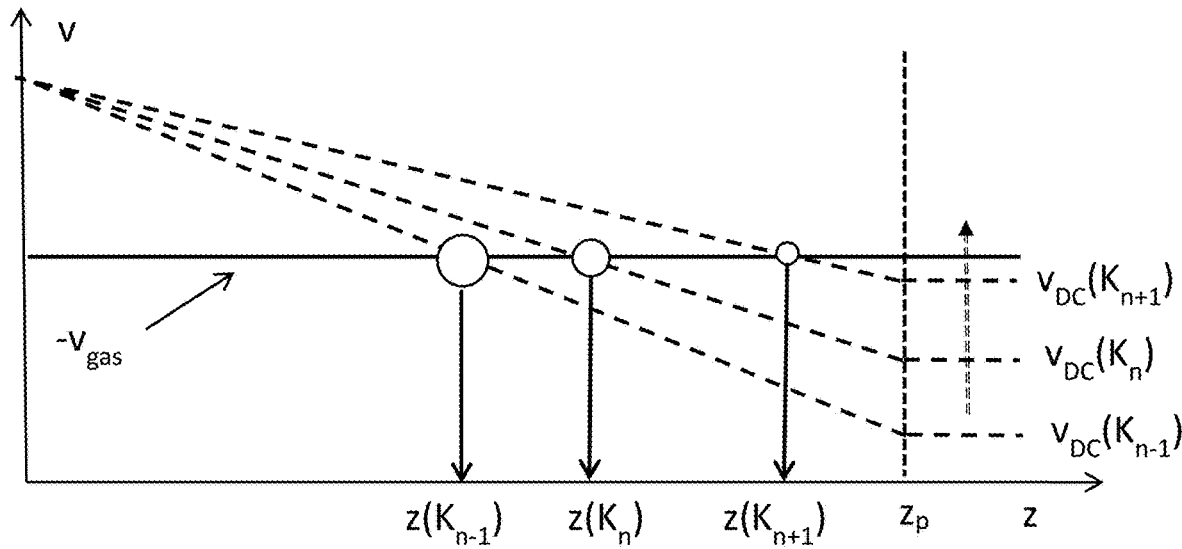
FIG. 6E is a graphical depiction similar to FIG. 6D, but which shows the effective velocity components of the electric DC field gradient for each of several ion species of different ion mobility.
Figure 6F:
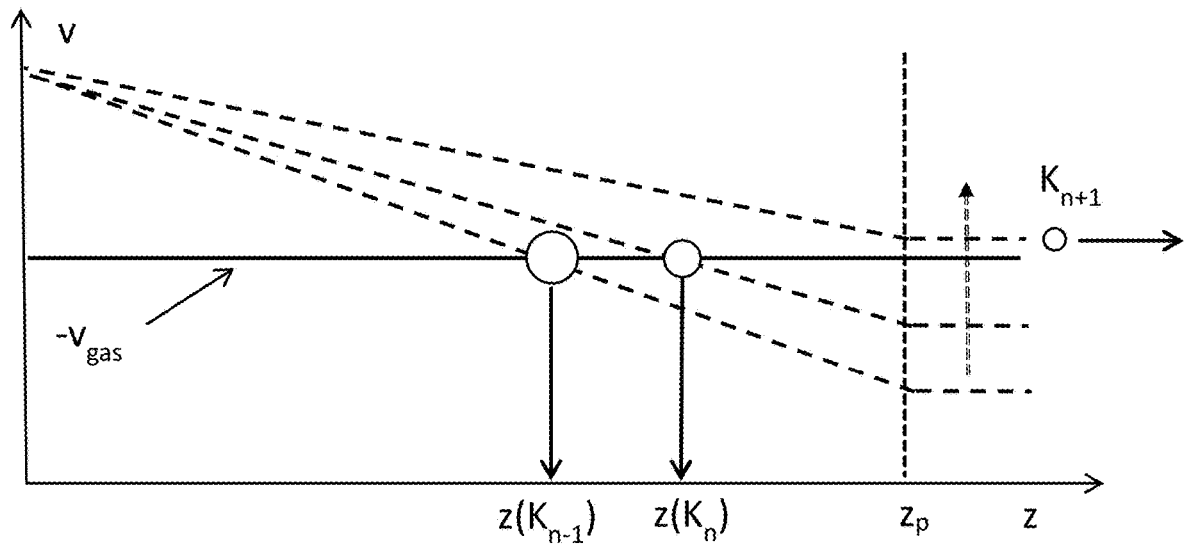
FIG. 6F is a graphical depiction similar to FIG. 6E, but which shows the elution of the different ion species of different ion mobility.

The effect of the opposing axial forces on the ions in the laterally extended TIMS 600 is shown in FIGS. 6D-6F, each of which is a graph of velocity (or an effective velocity component) versus position along the z-axis. The axial forces in this embodiment are provided by an opposing gas flow and electric DC field gradient. As shown in FIG. 6D, the gas flow in this embodiment is directed in the −z direction along the z-axis, opposing the direction of travel of the ions, and has a constant gas velocity along the z-axis. The electric DC field gradient is generated by the DC potentials applied to the electrode structures 604. The strength of the electric DC field gradient decreases along the z-axis until it reaches the plateau region 603 (at z=zp). This results in a separation of the ions of each channel in the z-direction by mobility from low mobility to high mobility. As shown in FIGS. 6E and 6F, the electric DC field gradient is thereafter increased at the plateau region 603 such that the ions progressively overcome the opposing force of the gas flow, and are eluted from the laterally extended TIMS 600 in decreasing order of mobility.

In an example of this embodiment, a single RF frequency is used and applied synchronously, and in the same manner, to all electrodes of the electrode structures 604 so as to establish the separate ion channels and trapping regions along the x- and y-direction. The operating pressure may be from ten to 5000 Pa (0.1 to 50 mbar) and is typically around 300 Pa (3 mbar). The ion region is 50 mm long, 50 mm wide and 4 mm high. In this version, there are fifty different electrode structures, which are separated from each other by 1 mm. The RF frequency is 1 MHz and the velocity of the gas flow is about 100 m/s.

Figure 7:
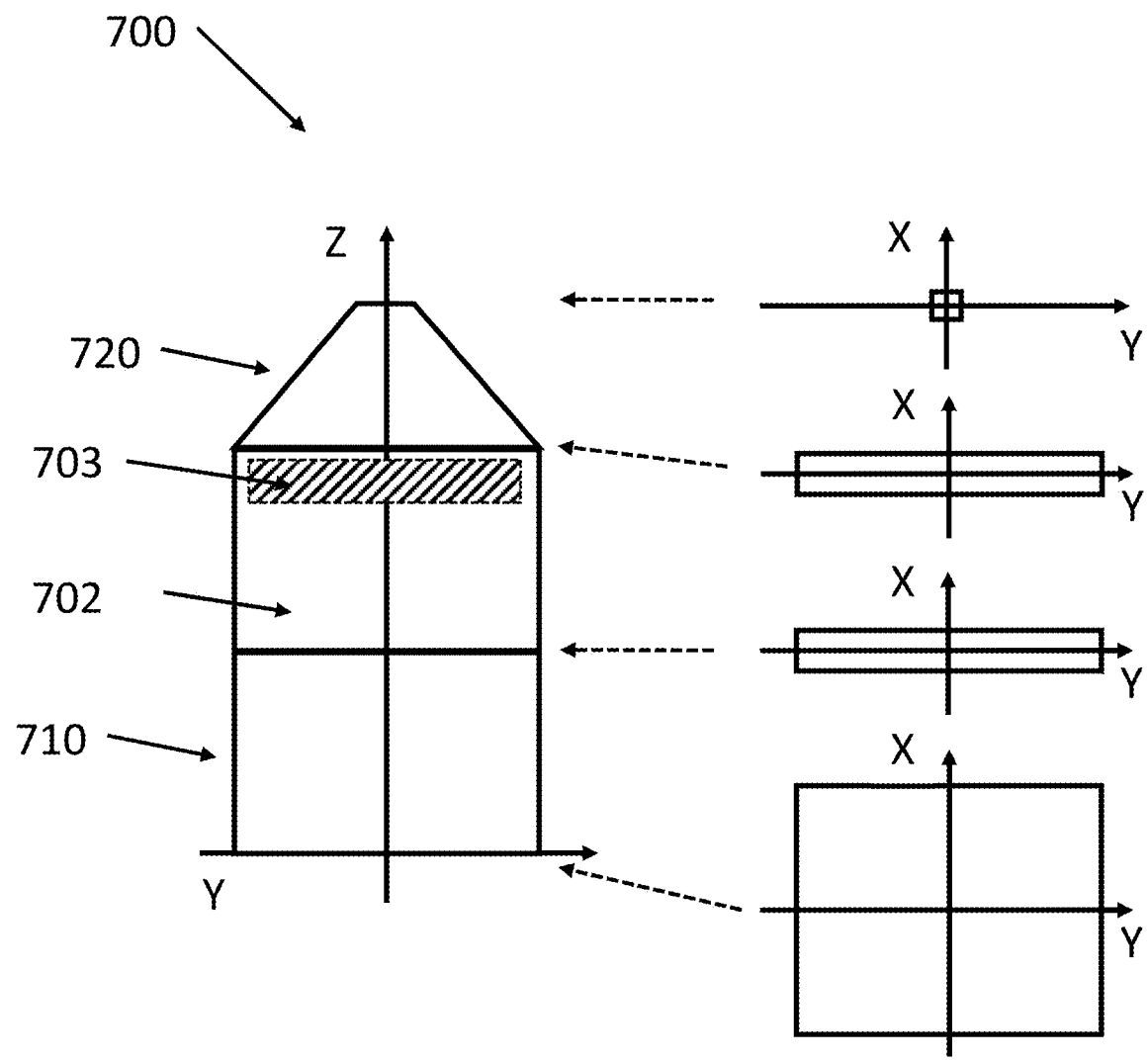
FIG. 7 shows schematically a laterally extended TIMS having an ion region with a convex cross-sectional profile and comprising an entrance funnel and an exit funnel.

FIG. 7 shows a laterally extended TIMS 700 such as those discussed above with an upstream ion funnel 710 and downstream ion funnel 720. In this arrangement, ions (e.g., from an ion source) are directed into the ion funnel 710 that, as shown in the adjacent cross-sectional insets, maintains the width of the ion region in the y-direction, while progressively reducing the x-dimension. The ion region 702 is the separating part of the laterally extended TIMS 700 and has a laterally extended shape that allows for simultaneous treatment of the ions that are spread out in the long dimension. Ions are separated in the ion region 702 and eluted out sequentially by ion mobility, as discussed above, and exit the plateau region 703 into the second ion funnel 720 that has a decreasing profile in the y-direction. This concentrates the separated, eluted ion species into a smaller profile at the exit of the ion funnel 720.

Figure 8:
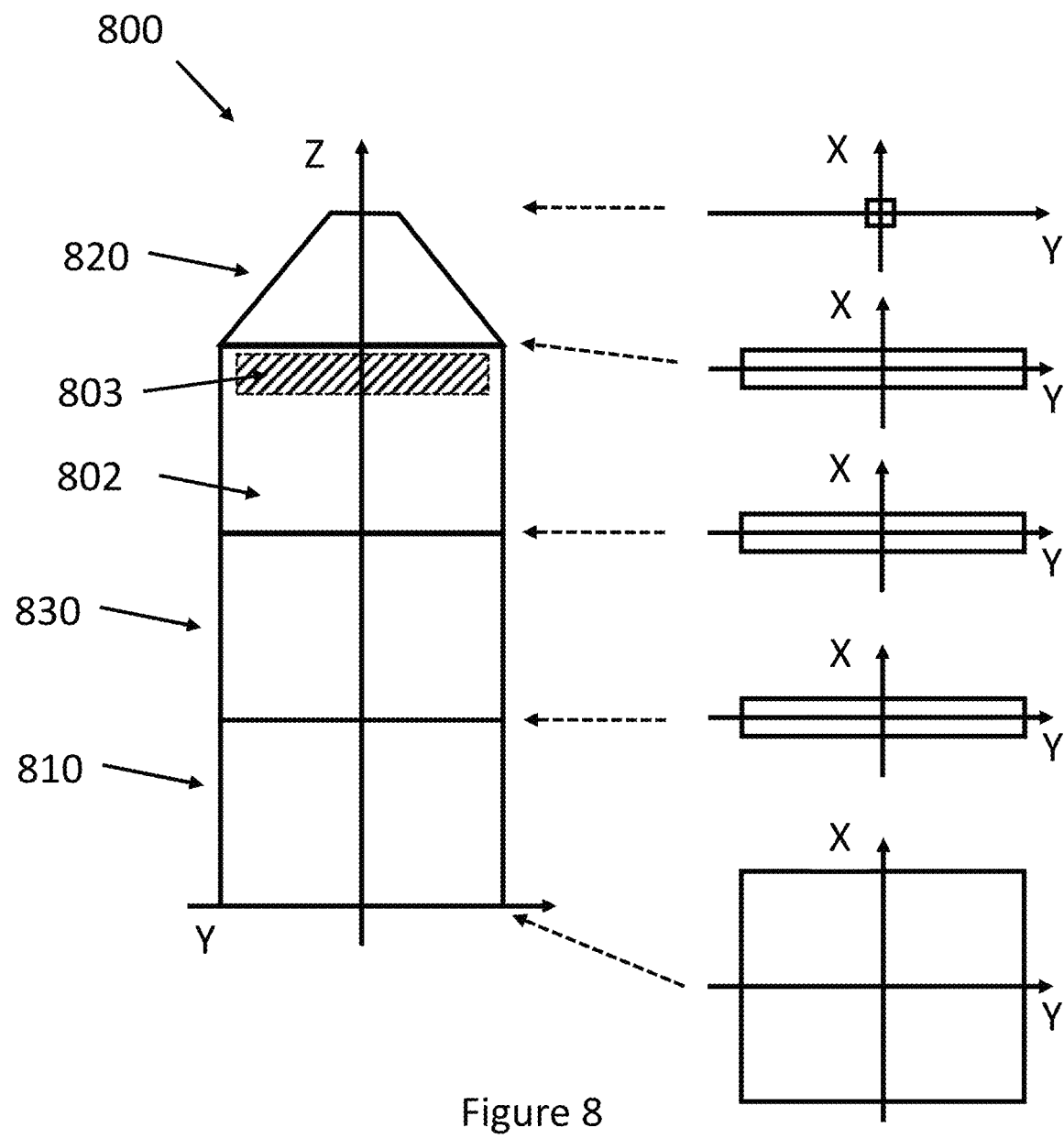
FIG. 8 shows schematically a laterally extended TIMS having an ion region with a convex cross-sectional profile and comprising an entrance funnel, an exit funnel and an ion trap.

FIG. 8 shows a laterally extended TIMS 800 with an upstream ion funnel 810, an ion trap 830 and downstream ion funnel 820. The ion region 802 is the separating part of the laterally extended TIMS 700. Like in the embodiment above, ions (e.g., from an ion source) are directed into the ion funnel 810 that, as shown in the adjacent cross-sectional insets, maintains the width of the ion region in the y-direction, while progressively reducing the x-dimension. The ion funnel 810 directs the ions into the ion trap 830 having a laterally extended profile to allow accumulation of ions while pre-accumulated ions are separated by mobility in parallel in the ion region 802 of the laterally extended TIMS 800 which may use one of the embodiments discussed above. After an accumulation phase, ions from the ion trap 830 are introduced to the ion region 802, separated by mobility in the ion region 802 and then sequentially eluted over the plateau region 803 into exit funnel 820, which is tapered in the y-direction to concentrate the exiting ions into a smaller profile exit channel. Preferably, the volume of the ion trap 830 is at least as large as the volume of the ion region 802, more preferably the width and the height of the ion trap 830 is equal to those of the ion region 802.

Figure 9:
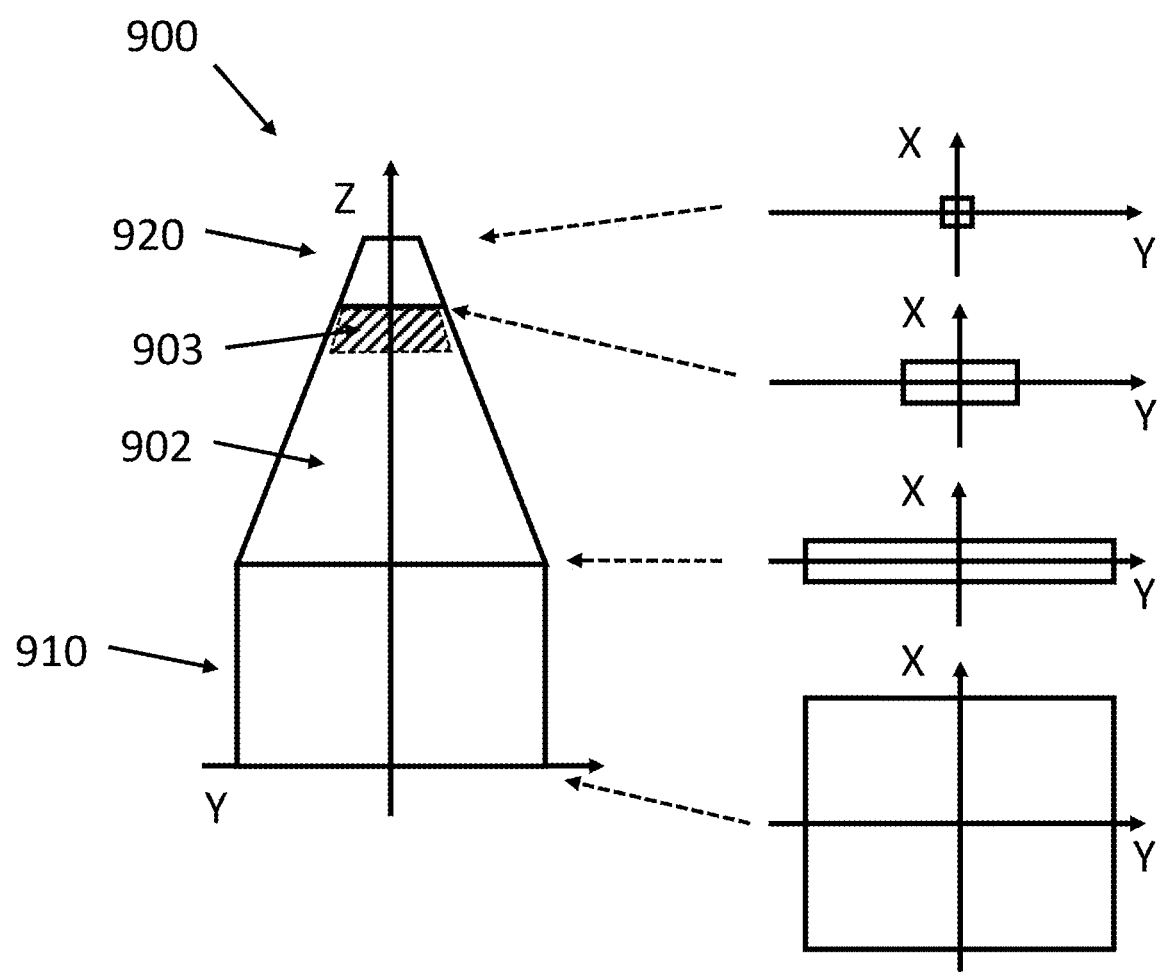
FIG. 9 shows schematically a laterally extended TIMS comprising an entrance funnel and an exit funnel, and having an ion region with a convex cross-sectional profile which varies along the axis.

FIG. 9 shows a laterally extended TIMS 900 with an upstream ion funnel 910 and a downstream ion funnel 920 wherein the upstream ion funnel 910 tapers in the y-direction to the entrance of the ion region 902. The ion region 902 is the separating part of the laterally extended TIMS 900. In this configuration, however, the ion region 902 itself is also tapered in the y-direction such that, while ions are separated by ion mobility, they are also concentrated in the y-direction into a plateau region 903 having a reduced profile in the long dimension. This tapered profile continues in the downstream ion funnel 920 following the plateau region 903, such that the ions exit into a smaller profile exit channel.

Figure 10:
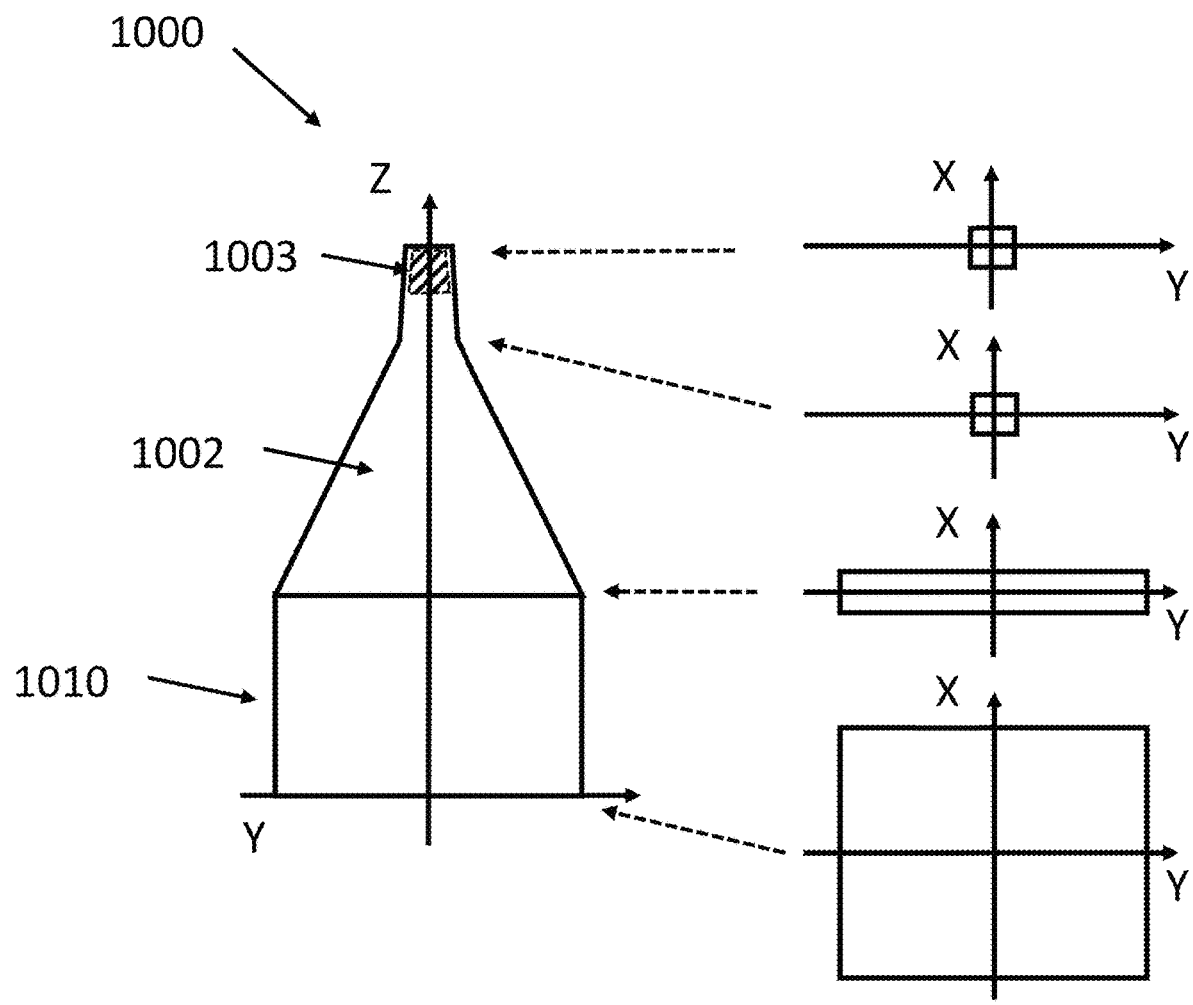
FIG. 10 shows schematically a laterally extended TIMS comprising an entrance funnel and having an ion region with a convex cross-sectional profile which varies along the axis, but stays constant in the plateau region.

FIG. 10 shows a laterally extended TIMS 1000 with an upstream ion funnel 1010. The ion region 1002 is the separating part of the laterally extended TIMS 1000. In this configuration, the ion funnel 1010 tapers in the y-direction, as well as the ion region 1002. Unlike the FIG. 9 configuration, however, the tapering of the ion region 1002 reaches a final reduced cross section in the x and y directions prior to the ions reaching the plateau region 1003. From there, the ions are eluted sequentially by ion species to any downstream location.

Figure 11:
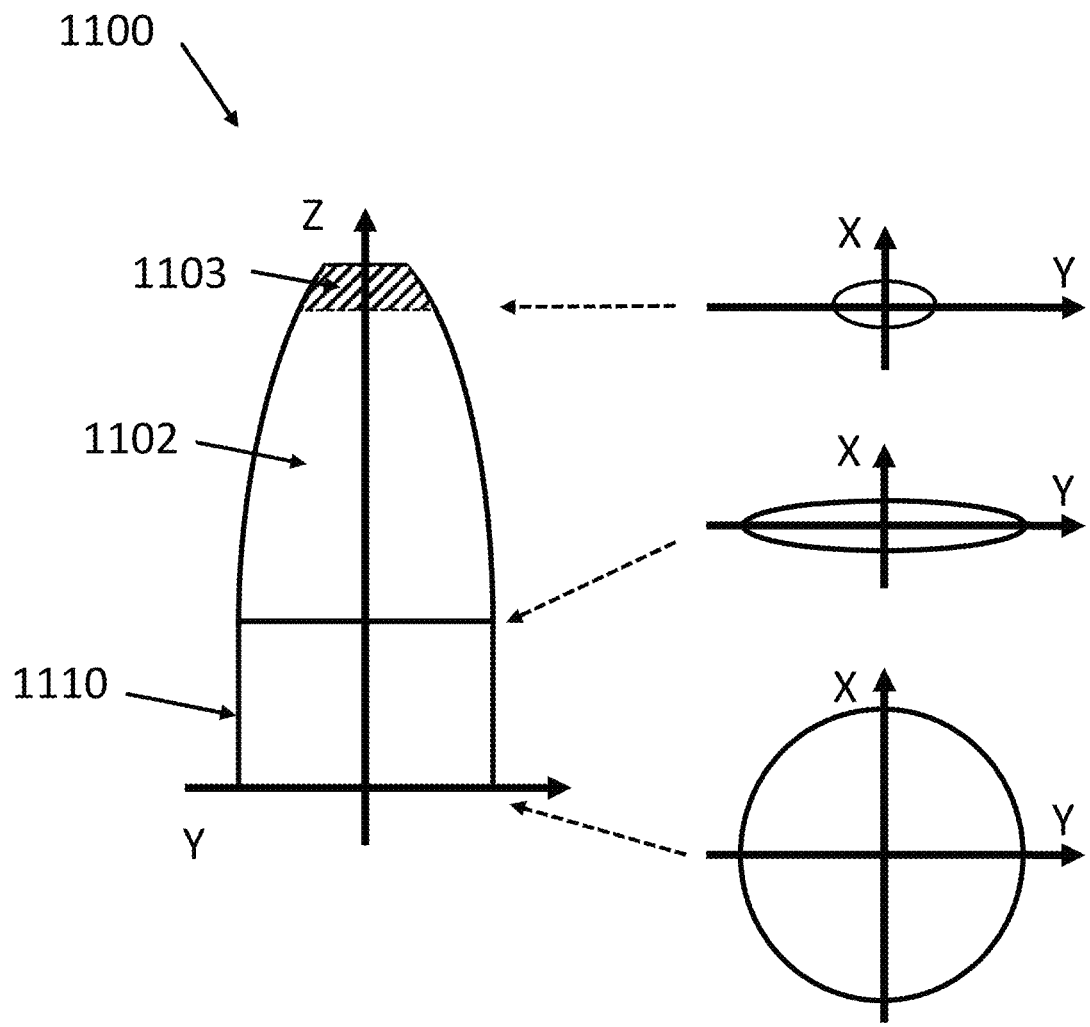
FIG. 11 shows schematically a laterally extended TIMS comprising an entrance funnel and having an ion region with a convex cross-sectional profile which is elliptically shaped and varies along the axis.

FIG. 11 shows a laterally extended TIMS 1100 with an upstream ion funnel 1110. The ion region 1102 is the separating part of the laterally extended TIMS 1100. In this configuration, the upstream on funnel 1110 tapers in the x-direction from a circular cross section to an elliptical exit into the ion region 1102. The ion region 1102 as well as the plateau region 1103 also have a reducing profile, from the elongated elliptical shape at the entrance of the ion region 1102 to a more concentrated output profile at the plateau region 1103.

Figure 12:
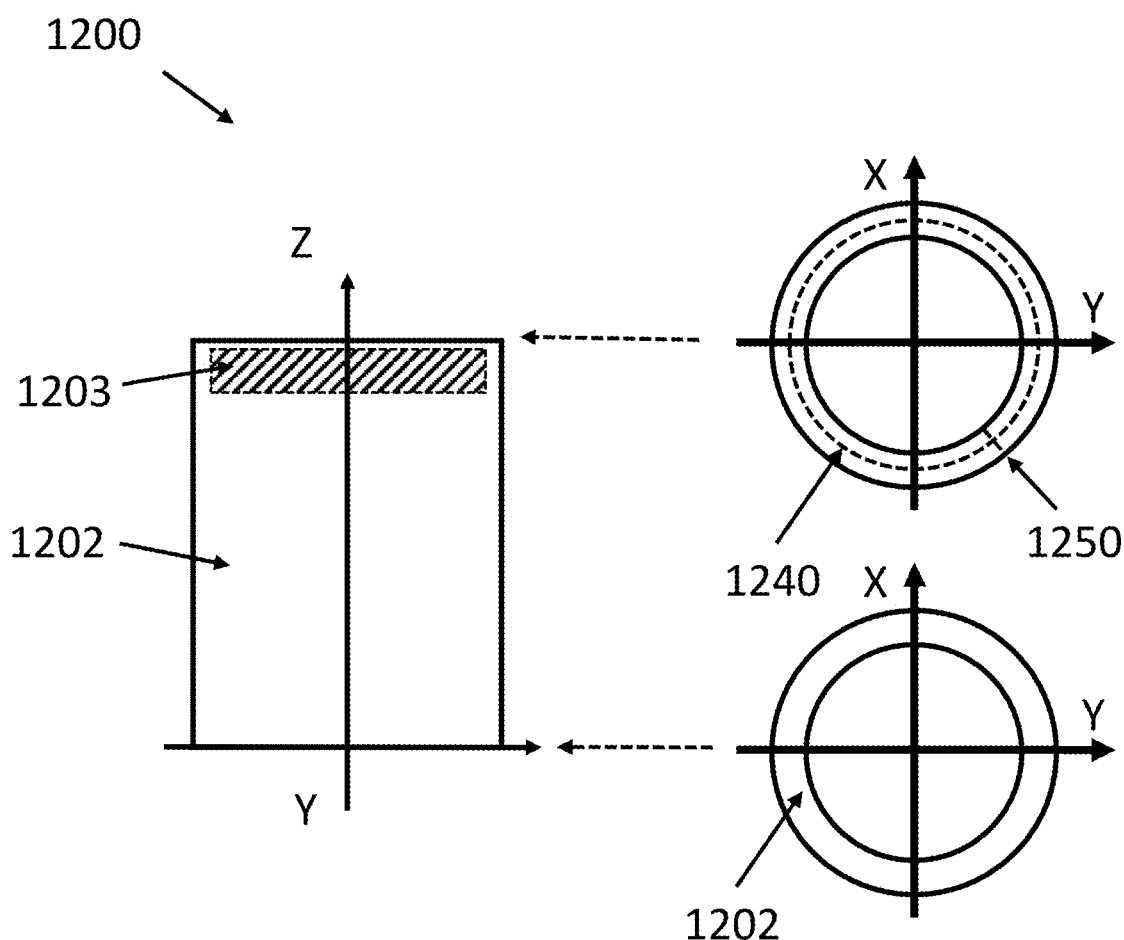
FIG. 12 shows schematically a laterally extended TIMS with an ion region with a non-convex cross-sectional profile between co-axial outer and inner circular surfaces.

FIG. 12 shows a laterally extended TIMS 1200 with an ion region 1202 with a non-convex cross-sectional profile. The ion region 1202 of the laterally extended TIMS has an annular cross-sectional profile which is generated by the electrode structure and the housing of the laterally extended TIMS 1200. The long dimension 1240 is along the closed path inside the annular space and the short dimension 1250 is along the radial direction between the outer and inner radius of the annular space. The ions are separated and eluted from the plateau region 1203 by ion mobility, as discussed above, and may be redirected as desired at the exit of the laterally extended TIMS 1200. The advantage of a non-convex cross-sectional profile is that the influence of one charge on another will be reduced and thus the charge capacity of the TIMS will be enhanced.

Figure 13:
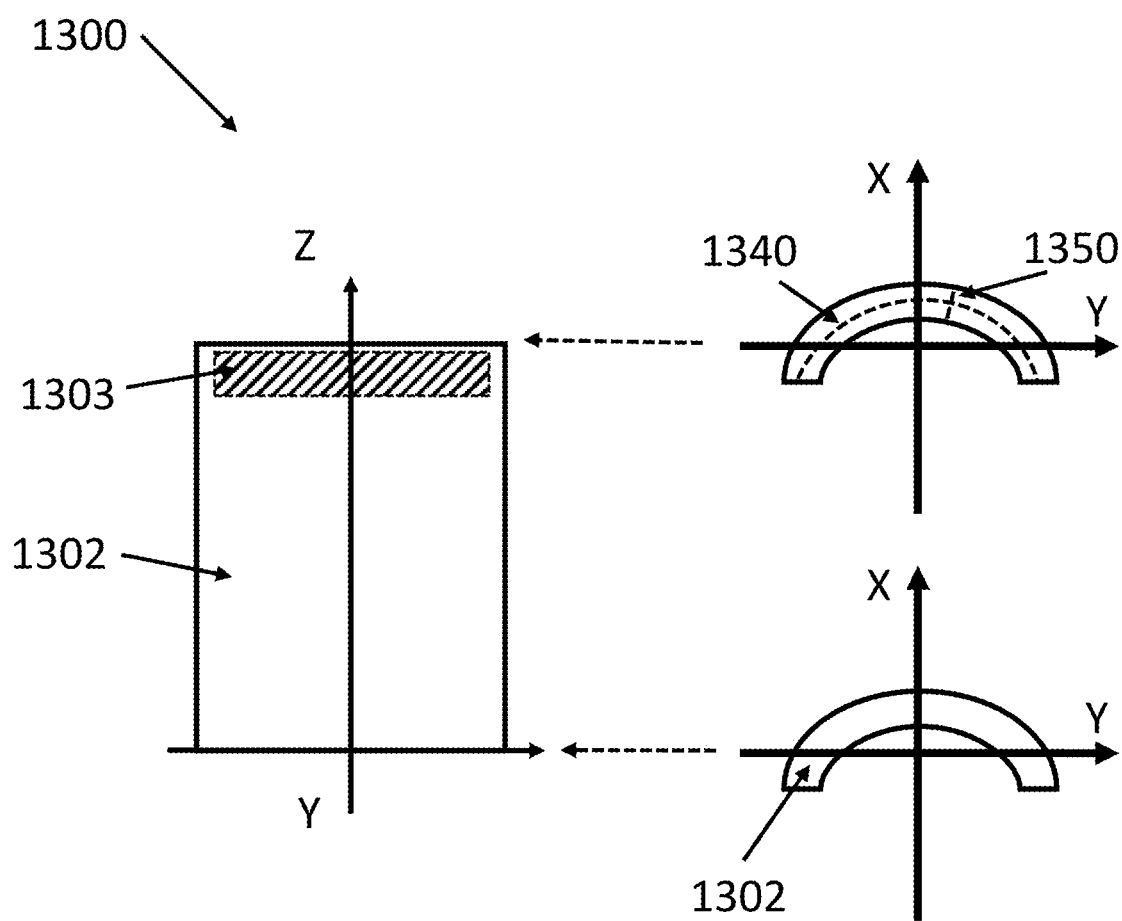
FIG. 13 shows schematically a laterally extended TIMS with an ion region with a non-convex cross-sectional profile which is horseshoe shaped.

FIG. 13 shows another example of a laterally extended TIMS 1300 with an ion region 1302 having a non-convex cross-sectional profile. In this version, the ion region 1302 has a generally arcuate cross-sectional profile. Thus, the extended ion region is not linear, or parallel with the y-axis, but it extends laterally along the arcuate shape, and thereby similarly allows a larger volume of ions to be separated simultaneously by ion mobility. The long dimension 1340 is along an azimuthal path inside the arcuate space and the short dimension 1350 is along the radial direction between the outer and inner arc. In a modified embodiment, the azimuthal extent of the cross-sectional profile (length of the arcuate space) can decrease along the axis of the laterally extended TIMS which reduces the conductance and thus the required pumping capacity for generating a gas flow.

Figure 14:
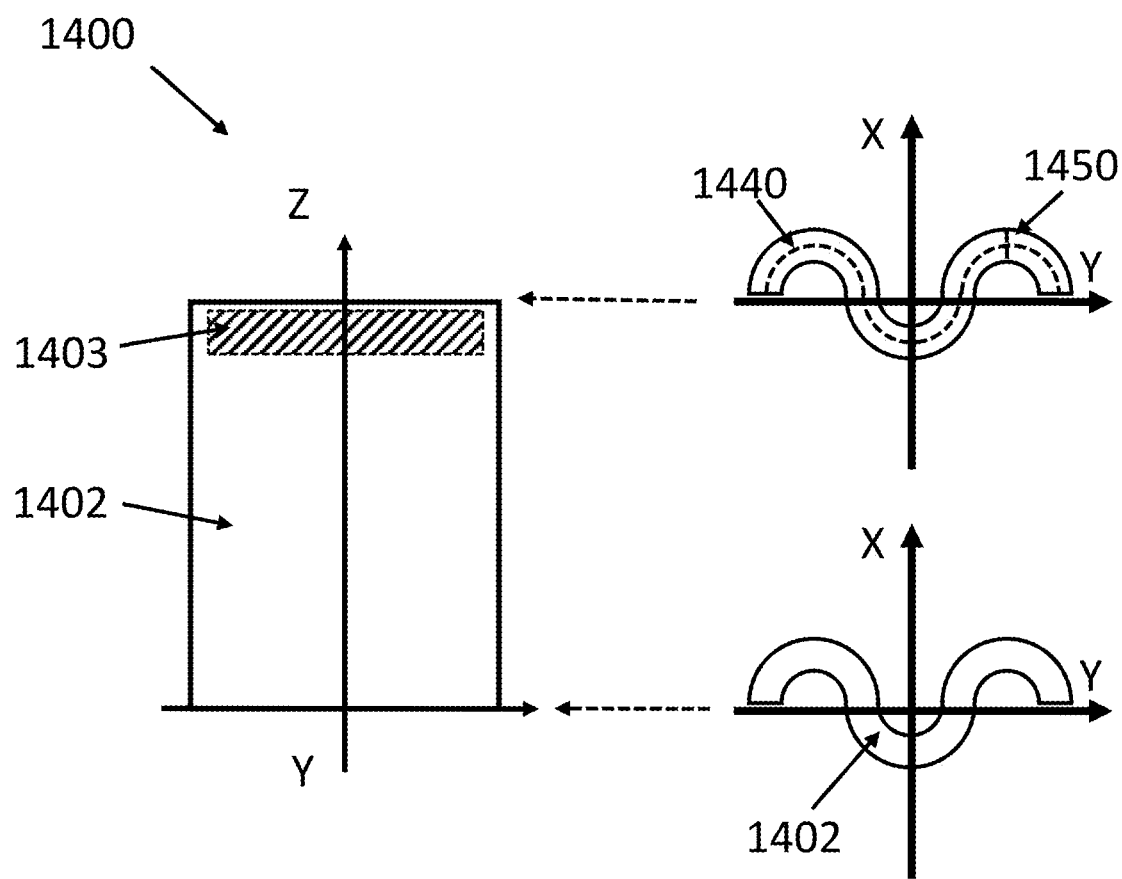
FIG. 14 shows schematically a laterally extended TIMS comprising an ion region with a non-convex cross-sectional profile which is serpentine.

In an arrangement similar to that of the FIG. 13, the FIG. 14 shows another example of a laterally extended TIMS 1400 with an ion region 1402 having a non-convex cross-sectional profile. Here, the cross-sectional profile is serpentine, and the ions are therefore distributed along several arcuate sections of the ion region 1402. The long dimension 1440 is along the serpentine inside the ion region 1402 and the short dimension 1450 is along the direction between the outer and inner arc. Following separation and elution from the plateau region 1403, the ions may be collected and transported as desired.

The invention claimed is:

1. A trapped ion mobility separator comprising:
an ion region through which ions travel along an axis from an entrance to an exit, the ion region containing a gas through which the ions pass and having an elongate cross-sectional profile perpendicular to the axis with a long dimension and a short dimension;
a series of electrode structures that are arranged along the axis, and that encompass the elongate cross-sectional profile along at least said long dimension, each electrode structure comprising an elongate electrode that extends parallel to said long dimension, the elongate electrodes being located, respectively, on first and second sides of the ion region relative to the short dimension in an alternating arrangement along the axis, wherein the elongate electrodes of the first side are arranged in a first series of adjacent elongate electrodes and the elongate electrodes of the second side are arranged in a second series of adjacent elongate electrodes, wherein each of the adjacent elongate electrodes of the first side have a relative spacing equal to a relative spacing of each of the elongate electrodes of the second side, and wherein, relative to the adjacent elongate electrodes of the first side, positioning of the adjacent elongate electrodes of the second side along the axis is offset by a distance equal to half of said relative spacing;

at least one RF generator that generates varying voltage potentials that are applied to the electrode structures including a first RF voltage a first phase of which is applied to every other elongate electrode on the first side of the ion region while a phase of the first RF voltage opposite to the first RF voltage first phase is applied to the remaining elongate electrodes on the first side, the at least one RF generator further generating a second RF voltage that has a frequency different than that of the first RF voltage, a first phase of the second RF voltage being applied to every other elongate electrode of the second side of the ion region while a phase of the second RF voltage opposite to the second RF voltage first phase is applied to the remaining elongate electrodes on the second side, the first and second RF voltages providing an electric confining field that exerts a confinement force on the ions in the ion region relative to said short dimension;

a first force-generator that exerts a first axial force on the ions along the axis; and a second force-generator that exerts a second axial force on the ions along the axis which is counteracting the first axial force;

wherein at least one of the first and second axial forces has an effect on the ions that is ion mobility dependent, and wherein at least one of the first and second axial forces varies spatially along the axis such that ions are trapped and separated by ion mobility along the axis during an accumulation phase, and wherein the first and/or the second force generator is configured to vary the magnitude of the first force relative to the second force over time during an elution phase such that the ions are progressively driven to the exit as a function of ion mobility.

2. The trapped ion mobility separator according to claim 1, wherein the first axial force and second axial force are of different respective types, each being generated by one of an axial gas flow, an axial electric DC field and an axial transient electric DC field.

3. The trapped ion mobility separator according to claim 2, wherein electric DC potentials or transient electric DC potentials are applied to the electrode structures to generate the axial electric DC field or the axial transient electric DC field, respectively.

4. The trapped ion mobility separator according to claim 1, wherein said at least one of the first and second axial forces that varies spatially along the axis comprises a gradient along a first portion that flattens to a plateau of substantially constant force.

5. The trapped ion mobility separator according to claim 4, wherein the ions in the ion region extend substantially parallel to the plateau in the vicinity of the plateau.

6. The trapped ion mobility separator according to claim 4, wherein the first or the second axial force is a gas flow with a substantially constant velocity in the ion region along said long dimension in the vicinity of the plateau.

7. The trapped ion mobility separator according to claim 1, wherein the varying voltage potentials applied to the electrode structures generate a second electric confining field that exerts a confinement force on the ions in the ion region relative to said long dimension.

8. The trapped ion mobility separator according to claim 1, further comprising additional electrodes at one or both sides of the ion region in the long dimension to which electric RF or DC potentials are applied so as to generate a second electric confining field that exerts a confinement force on the ions in the ion region relative to said long dimension.

9. The trapped ion mobility separator according to claim 1, wherein the elongate electrodes have, at each end relative to said long dimension, an extended portion in the short dimension such that the varying voltage potentials applied to the electrode structures generate a second electric confining field that exerts a confinement force on ions in the ion region relative to said long dimension.

10. A trapped ion mobility separator according to claim 1, wherein a ratio H/S between a height H of the ion region along the short dimension and a spacing of the elongate electrodes is less than ten.

11. The trapped ion mobility separator according to claim 1, further comprising an ion trap located upstream of the ion region.

12. A method for analyzing ions according to mobility using a trapped ion mobility separator comprising:

providing an ion region through which ions travel along an axis from an entrance to an exit, the ion region containing a gas through which the ions pass and having an elongate cross-sectional profile perpendicular to the axis with a long dimension and a short dimension;

providing a series of electrode structures that are arranged along the axis and that encompass the elongate cross-sectional profile along at least said long dimension, each electrode structure comprising an elongate electrode that extends parallel to said long dimension, the elongate electrodes being located, respectively, on first and second sides of the ion region relative to the short dimension in an alternating arrangement along the axis, wherein the elongate electrodes of the first side are arranged in a first series of adjacent elongate electrodes and the elongate electrodes of the second side are arranged in a second series of adjacent elongate electrodes, wherein each of the adjacent elongate electrodes of the first side have a relative spacing equal to a relative spacing of each of the adjacent elongate electrodes of the second side, and wherein, relative to the adjacent elongate electrodes of the first side, positioning of the adjacent elongate electrodes of the second side along the axis is offset by a distance equal to half of said relative spacing;

generating a first RF voltage a first phase of which is applied to every other elongate electrode on the first side of the ion region while a phase of the first RF voltage opposite to the first RF voltage first phase is applied to the remaining elongate electrodes on the first side;

generating a second RF voltage that has a frequency different than that of the first RF voltage, a first phase of the second RF voltage being applied to every other elongate electrode of the second side of the ion region while a phase of the second RF voltage opposite to the second RF voltage first phase is applied to the remaining elongate electrodes on the second side, the first and second RF voltages providing an electric confining field that exerts a confinement force on the ions in the ion region relative to said short dimension;

generating a first axial force that is imparted to the ions along the axis;

generating a second axial force that is imparted to the ions along the axis and that counteracts the first force, wherein at least one of the first and second axial forces varies spatially along the first axial direction such that ions are trapped and separated by ion mobility along the axis;

varying at least one of the first and second axial forces to increase a magnitude of the first axial force relative to the second force over time such that the ions are progressively driven to the exit of the ion region and separated as a function of ion mobility.

13. The method according to claim 12, further comprising generating a second electric confining field that exerts a confinement force on the ions in the ion region relative to said long dimension by applying RF potentials or DC potentials to additional electrodes of the electrode structures.

14. The method according to claim 12, wherein the first axial force and second axial force are of different respective types, each being generated by one of an axial gas flow, an axial electric DC field and an axial transient electric DC field.

15. The method according to claim 14, wherein electric DC potentials or transient electric DC potentials are applied to the electrode structures to generate the axial electric DC field or the axial transient electric DC field, respectively.

16. The method according to claim 12, further comprising analyzing separated ions as a function of mass in a mass analyzer located downstream of the trapped ion mobility separator.

17. The method according to claim 12, further comprising fragmenting separated ions into fragment ions, and analyzing the fragment ions in a mass analyzer located downstream of the trapped ion mobility separator.

18. The method according to claim 17, wherein the separated ions are selected and/or filtered according to mass prior to the fragmentation.

19. The method according to claim 12, further comprising accumulating ions from an ion source in an ion trap located upstream of the trapped ion mobility separator while ions are analyzed in the trapped ion mobility separator.

* * * * *